United States Patent [19]

Timmerman

[11] Patent Number: 4,562,728
[45] Date of Patent: Jan. 7, 1986

[54] ABSOLUTE COMPRESSION TEST

[75] Inventor: George E. Timmerman, Tucson, Ariz.

[73] Assignee: United Technologies Corporation, Hartford, Conn.

[21] Appl. No.: 677,764

[22] Filed: Dec. 3, 1984

[51] Int. Cl.$^4$ ............................................. G01M 15/00
[52] U.S. Cl. ........................................ 73/116; 364/551
[58] Field of Search .................. 73/116, 115; 364/551, 364/431.04, 431.03

[56] References Cited

U.S. PATENT DOCUMENTS

| | | | |
|---|---|---|---|
| 4,050,296 | 9/1977 | Benedict | 73/116 |
| 4,292,670 | 9/1981 | Reid et al. | 73/116 |
| 4,348,893 | 9/1982 | Hendrix et al. | 73/116 |

*Primary Examiner*—Stephen A. Kreitman
*Attorney, Agent, or Firm*—Francis J. Maguire, Jr.

[57] ABSTRACT

A method and apparatus for determining the absolute compression pressure of each cylinder in an internal combustion engine is disclosed. The technique involves analyzing the changes in engine kinetic energy in order to calculate both the work of compression and expansion of each cylinder in a multi-cylinder engine typically during a decelerating engine cycle. Speed data is obtained and the work associated with the compression and expansion process for each cylinder is calculated and compared to the compression and expansion data of a good engine which is stored in computer memory. If a compression fault is present, it can be detected because that cylinder will display a decrease in both the work of compression and expansion. Once a faulted cylinder has been identified, the magnitude of the fault can be calculated and normalized and the compression pressure of each cylinder calculated and displayed.

17 Claims, 27 Drawing Figures

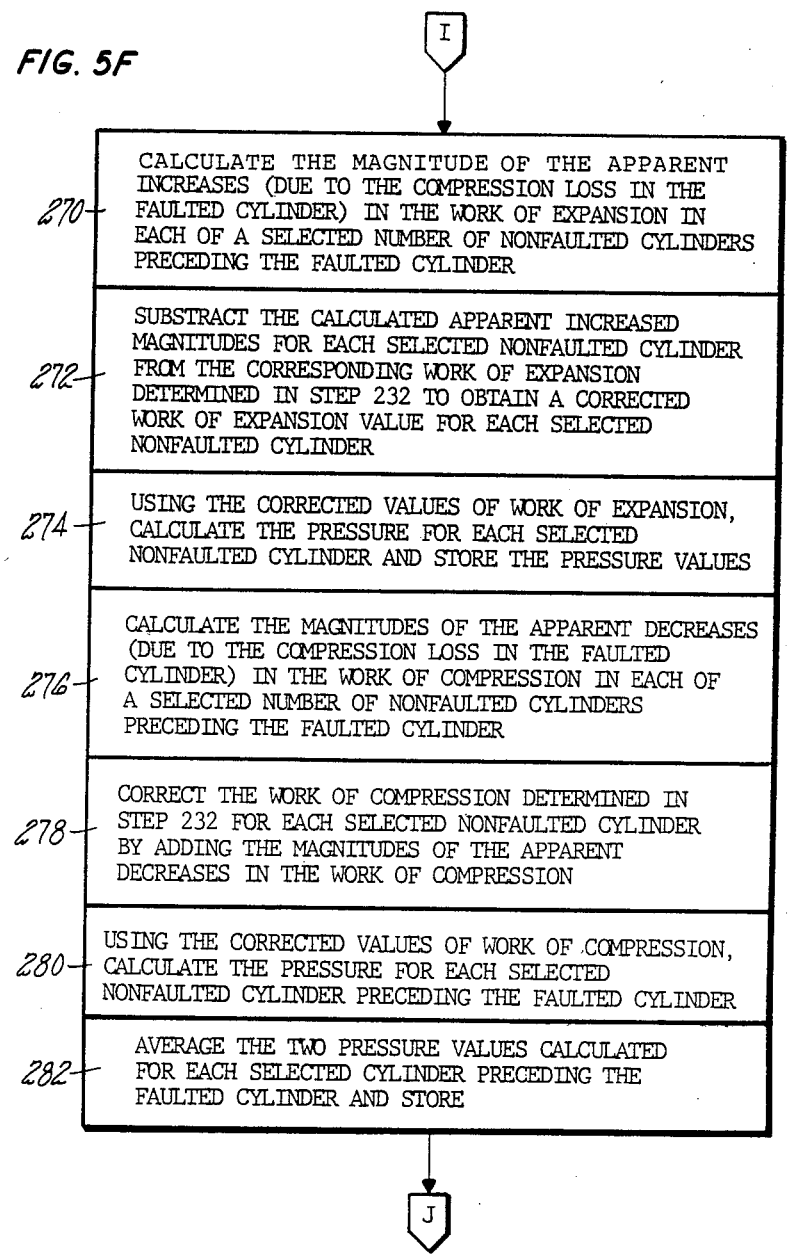

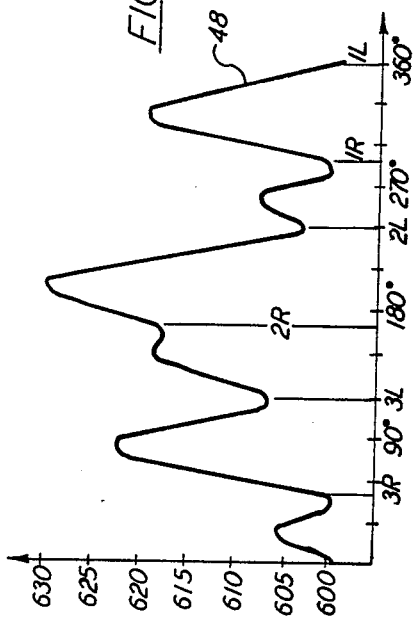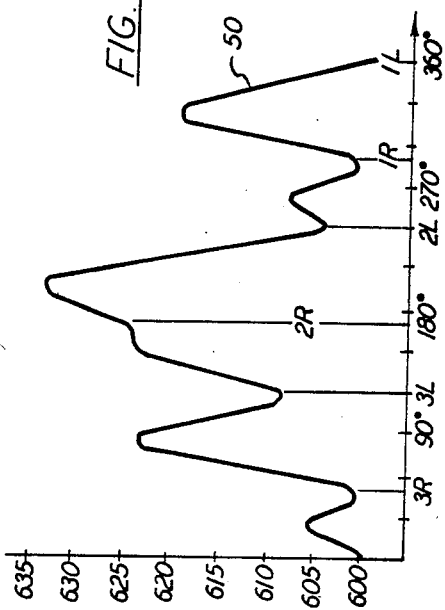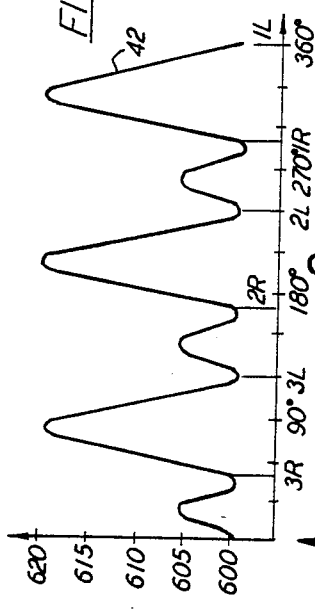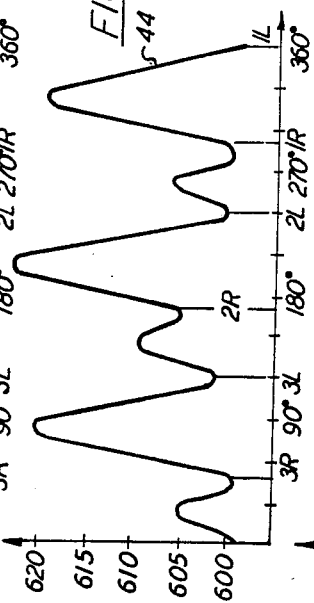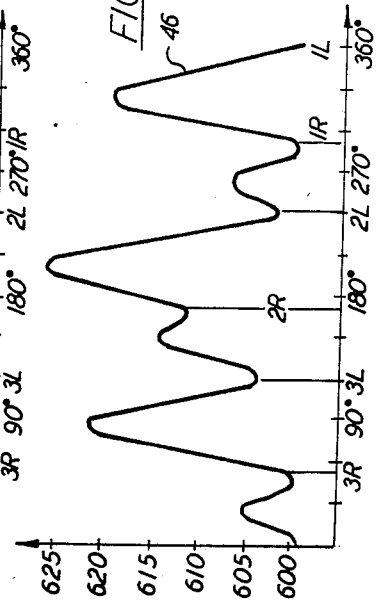

ABSOLUTE COMPRESSION TEST

The government has rights in the subject invention pursuant to contract DAAE07-80-C-9116 awarded by the Department of the Army.

DESCRIPTION

1. Technical Field

This invention relates to diagnosing internal combustion engines electronically.

2. Background Art

Electronic engine diagnostic testing of cylinder compression in the prior art has included relative individual cylinder compression pressure tests. One prior art test is performed by measuring the flywheel speed fluctuations that result from the compression process of each cylinder and then comparing the magnitude of the speed fluctuation for each cylinder to the cylinder with the largest speed fluctation, i.e., the cylinder with the best compression. Test results for each cylinder are then reported as percentages of the best cylinder which is assigned a test result of 100%.

This relative type of test has performed well in many applications where detection of a faulted cylinder is required. However, it cannot detect uniformly low cylinder compression pressures, nor can it give any indication of the actual cylinder compression pressure.

For example, in U.S. Pat. No. 4,050,296, granted to Benedict on Sept. 27, 1977 and assigned to the assignee of the present invention, the compression of each cylinder is expressed in a relative fashion as compared with the compression of another of the cylinders of the engine by sensing the peaks and valleys of a fluctuating engine parameter such as subcyclic speed. The difference between each peak and the preceding valley is measured and the differences are averaged with eight-tenths of the maximum difference and each is expressed as a percentage of the maximum difference. Thus, if the sensed parameter's subcyclic fluctuations are measured with sufficient exactness a good indication of relative compression for each cylinder may be obtained.

The above referred to Benedict patent is intended for use with symmetric internal combustion engines. In a related U.S. Pat. No. 4,348,893, granted to Hendrix on Sept. 14, 1982 and assigned to the assignee of the present invention, the compression of each cylinder in an asymmetric internal combustion engine is determined. The method of the Hendrix disclosure is to measure the change and speed of the engine crankshaft while the engine is cranked without ignition during each cylinder sub-cycle. The actual change in speed from a minumum to a maximum is measured during the compression stroke of the first cylinder and during the expansion stroke of the second cylinder in each of any number of pairs of asymmetric cylinder pairs. The compression stroke delta for the first bank of cylinders and the expansion stroke delta for the second bank of cylinders are ratioed to the maximum delta value measured from among all cylinders to provide the relative compression ratio of each as a percentage of the maximum.

For both the Benedict and Hendrix methods, in many cases a faulted cylinder will exhibit a change in the monitored parameter which greatly affects the behavior of one or more of the adjacent cylinders with respect to the monitored parameter. In such cases, it may be difficult to distinguish which of the cylinders is actually faulted. For example, if the speed of the flywheel is being monitored, a compression fault in a given cylinder will be evidenced by a speed fluctuation in the subcyclic speed waveform in the region corresponding to that particular cylinder. However, an adjacent non-faulted cylinder may have its portion of the speed waveform affected by the variations due to the faulted cylinder, to the extent that the waveform of the non-faulted cylinder may appear almost or equally as "sick" as the faulted cylinder. In such a case, the peak to valley difference for both the faulted and non-faulted cylinders may be roughly comparable thereby making the above described relative compression comparisons less effective.

In addition, when an engine has more than one faulted cylinder the combined effect on the monitored parameter with respect to both the faulted and non-faulted cylinders may be so confused as to render the interpretive task extremely difficult.

A similar prior art approach, as disclosed by Reid et al., in U.S. Pat. No. 4,292,670 involves a determination of compression balance by sensing speed, calculating instantaneous kinetic energy changes for specific firing intervals at a specific speed during both acceleration and deceleration runs, and subtracting the deceleration measurement from the related acceleration measurement to obtain the net work produced by each cylinder. To determine compression balance the changes in kinetic energy for a number of segments just preceding top dead center in a firing interval are computed, compared, and ranked in order to determine the relative work of compression for the cylinders (see column 7, lines 42-61 of Reid et al). The Reid technique suffers from the same difficulty as the Benedict and Hendrix methods in that one or more faulted cylinders may affect the monitored parameter to a great extend with respect to the other cylinders.

Thus, a need exists to provide a method and means for overcoming the above described shortcomings of the prior art.

DISCLOSURE OF INVENTION

The object of the present invention is to provide an absolute compression measurement indication for all cylinders in any internal combustion engine.

According to the present invention low compression cylinders in an internal combustion engine may be positively identified by separately calculating the work of compression and expansion of each cylinder from the absolute subcyclic speed fluctuations attributed to each cylinder and designating those cylinders as low compression cylinders for which both the work of compression and expansion are each less then the work of compression and expansion, respectively, which would be performed by an ideal cylinder. If more than one faulted cylinder is identified, a correction is made for each faulted cylinder to correct for the apparent effects of the diminished work of each faulted cylinder on the calculated work of each of the other faulted cylinders. After correcting for the effects of the faulted cylinders on one another, a correction for the apparent effects of the diminished work of each faulted cylinder on the calculated work of each of the nonfaulted cylinders is made. The absolute compression pressure for each cylinder is computed using the corrected work calculations based on a predetermined relation expressing absolute compression pressure as a function of the work calculated of either compression or expansion for a given cylinder.

Thus, based upon engine model data analysis, it has been determined that it is possible to perform a significantly improved computerized compression test. The technique involves analyzing the changes in engine kinetic energy in order to calculate the work of compression and expansion of each cylinder in a multi-cylinder engine. Using this technique it is possible to accurately calculate the compression pressure of each cylinder. The compression test data is obtained in a similar manner as present computerized compression tests in that flywheel speed data is collected. The speed data is obtained via a magnetic probe mounted over the teeth of the flywheel and data collection is initiated when a signal is received from a cylinder identification probe mounted over the rocker arm of a fuel injector. In this way, data collection is always initiated starting with the same cylinder and once one cylinder is known the remaining cylinders can be identified based upon the firing order of the engine which is stored in the system memory. Engine model analysis has shown that the work required to cause the engine speed change between a speed peak and valley is directly proportional to the pressure of that cylinder. This is true even if a compression fault is present. When the improved compression test is performed, the collected speed data is used to calculate the work associated with the compression and expansion process of each cylinder of the engine in the test. This information is compared to the compression and expansion data of a good engine which is stored in computer memory. Based upon engine model data analysis, it has been determined that if a compression fault is present, it can be detected because that cylinder will display a decrease in both the work of compression and expansion. Other, nonfaulted cylinders may display an apparent increase or decrease in the work of compression or expansion due to the flywheel speed perturbation caused by the faulted cylinder. However, only the truly faulted cylinder will display a decrease in both. Once a faulted cylinder has been identified, the magnitude of the fault can be calculated by kinetic energy analysis. With the magnitude of the fault known, the flywheel speed waveform can be normalized, i.e., compensated for the perturbations caused to other nonfaulted cylinders. This is possible because the engine model data analysis has shown that the perturbations caused to a faulted cylinder are directly proportional to the magnitude of the fault. Utilizing the normalized waveform, the compression pressure of the remaining cylinders can be calculated by kinetic energy analysis.

Heretofore, in the electronic measurement of compression art, the detection of exactly which cylinder or cylinders have a compression fault has been confused to a large degree because of the overlapping effects of each faulted cylinder on nearby cylinders upon the monitored parameter, e.g., crankshaft speed. The present invention provides a reliable means of determining exactly which cylinder or cylinders are at fault which then permits an accurate determination of absolute compression. The present invention provides an advance over the prior art which will permit much more exact identification of faults and measurement of pressure.

The compression test according to the present invention identifies a compression fault by examining both the work of compression and expansion for each cylinder and comparing the results to data based constants to find a decrease in both the work of compression and expansion in order to identify one or more faulted cylinders. Existing compression tests define a fault as being some percentage of what is determined to be a 100% cylinder and only examine the compression process. The compression test according to the present invention normalizes the flywheel speed fluctuation waveform to compensate for the effect of faulted cylinders. Existing compression tests perform no fault compensation. The compression test according to the present invention reports the actual compression pressure for each cylinder. It is an absolute compression test. Present compression tests are relative, that is, they report individual cylinder test results as a percentage of what is determined to be the best cylinder.

These and other objects, features, and advantages of the present invention will become more apparent in light of the detailed description of an embodiment thereof, as illustrated in the accompanying drawing.

BRIEF DESCRIPTION OF THE DRAWING

FIGS. 5A-5G together constitute a logic flowchart diagram illustrating the steps of measuring absolute compression in an internal combustion engine as may be used in the embodiment of FIG. 1;

FIGS. 14-18 illustrate a progession of flywheel speed fluctuation waveforms beginning with an engine with no compression faults progressing through faults to cylinder 2R having magnitudes of 10, 20, 30, and 40%;

BEST MODE FOR CARRYING OUT THE INVENTION

The following description of a best mode embodiment according to the present invention will be described with respect to a particular asymmetric internal combustion engine. However, it should be understood that the teachings contained herein are equally applicable, with minor modifications, to symmetric internal combustion engines.

Figure 2:
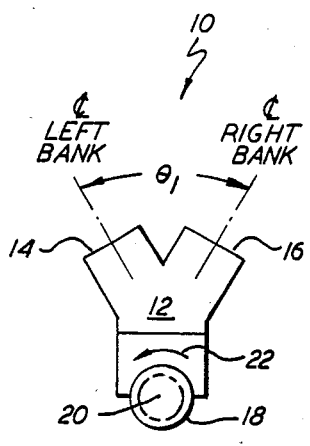
FIG. 2 is a simplified illustration of an end view of an internal combustion engine in which the present invention may be used.

Referring first to FIG. 2, in a simplified end view of an asymmetric internal combustion engine 10 the cylinders are disposed in a V configuration block 12 including a left bank of cylinders 14 and a right bank of cylinders 16 as referenced from the engine flywheel 18. The flywheel is connected to the engine crankshaft and includes a ring-gear 20, shown in phantom. In this detailed description the engine is a six cylinder, 2 cycle (2 stroke) type with right-hand rotation, such as the Detroit Diesel Allison (DDA) model 6V-53 with crankshaft rotation in the counterclockwise direction as shown by arrow 22. The V displacment of the cylinders results in an interbank angle ($\theta_1$)between the center lines of the left and right cylinder banks, which in the DDA 6V-53 is 66.7°.

Figure 3:
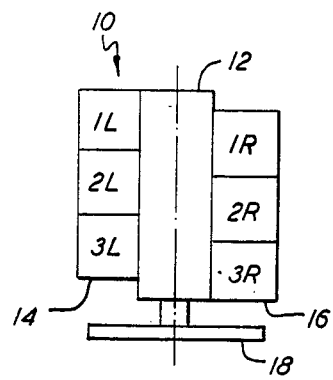
FIG. 3 is a top view of the engine in FIG. 2.
Figure 4:
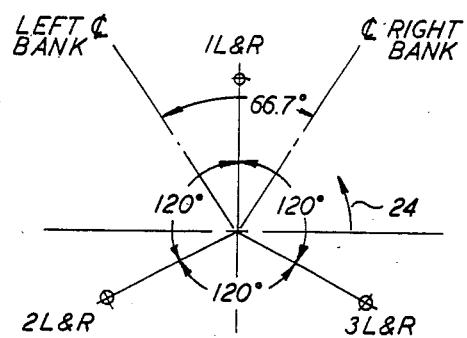
FIG. 4 is a flywheel end view of the crankshaft arrangement of the engine of FIGS. 2 and 3.
Figure 6:
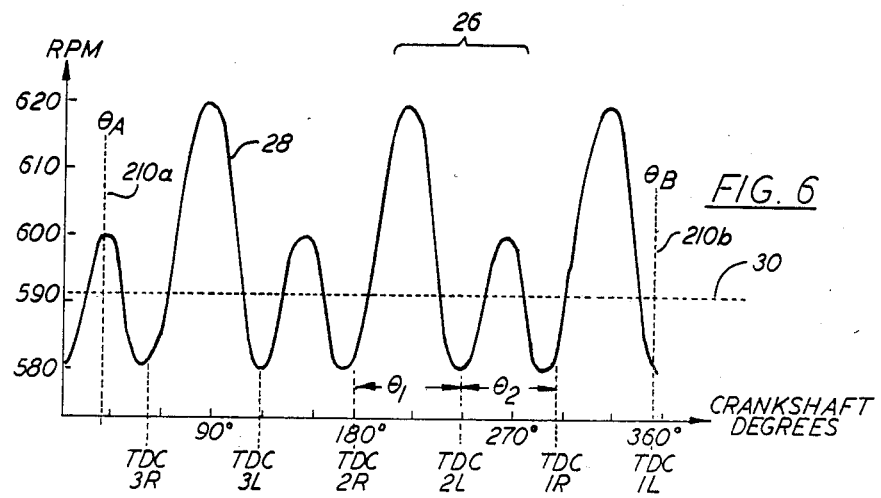
FIG. 6 is an illustration of absolute RPM and static RPM for the engine of FIGS. 2, 3, and 4.

Referring to FIG. 3, in a top view of the engine 10 of FIG. 2 the cylinders are designated 1, 2, and 3 left (L) and right (R) in consecutive order from the front of the engine to the flywheel. The two cycle engine includes a 2 stroke cylinder cycle, i.e., a compression stroke and a power stroke, occurring on each revolution (360°) of the crankshaft, such that one revolution of the crankshaft equal one engine cycle. In the V-6 engine the top dead center (TDC) piston position of the cylinders in each bank occur at equal crankshaft angular intervals of 120°; however, the cylinder firing order alternates from right bank to left bank cylinders with crankshaft angular spacing of TDC between successive firing right bank and left bank cylinders being defined by the interbank angle $\theta_1$. As shown in FIG. 4, in an asymmetric engine the interbank angle is not a cylinder sub-multiple of 360°, i.e., the DDA 6V-53 engine has an interbank angle of 66.7° which results in the asymmetery of TDC spacing along the crankshaft. In FIG. 4, the piston firing order may be visualized for the right hand rotation 24 shown. The crankshaft angle spacing between TDC of a right bank cylinder (such as 3R) and TDC of the next firing bank cylinder (3L) is equal to the interbank angle ($\theta_1 = 66.7°$) while that between TDC of the left bank cylinders (3L) and the next firing right banks cylinder (2R) is $\theta_2 - \theta_1$ (120°−66.7°) or 53.3° for the 6V-53 engine. The adjacent firing cylinders having their TDC displaced by $\theta_2$ comprise an asymmetrical cylinder pair, as illustrated by an asymmetrical cylinder pair part of a speed waveform 26, as illustrated in FIG. 6. The cylinder firing order is 1L, 3R, 3L, 2R, 2L, 1R.

Figure 7:
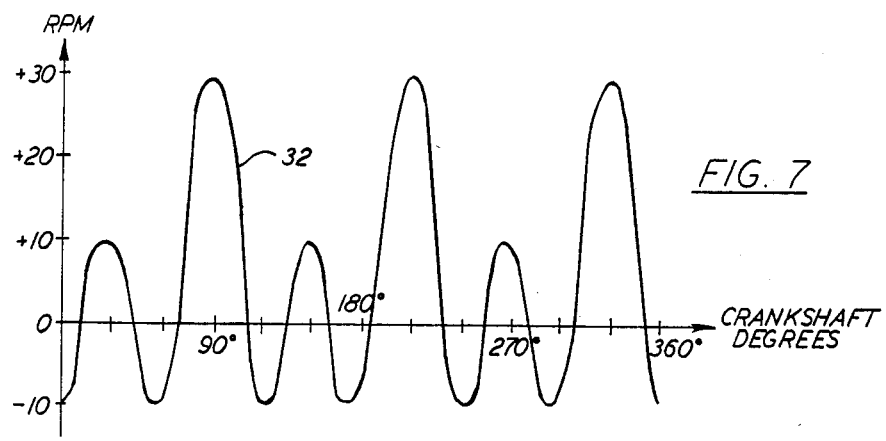
FIG. 7 is an illustration of the RPM waveform of FIG. 6 presented in terms of dynamic RPM.

FIG. 6 is an illustration of the absolute RPM waveform 28 for the 6V-53 engine. A distinction should be made between absolute RPM which is defined as the flywheel speed including the speed fluctuations due to subcylic dynamic events such as compression and expansion and static RPM 30 which is a complement of absolute RPM. Static RPM does not include the speed fluctuations due to subcylic events. It is basically tachometer RPM. Dynamic RPM 32, as shown in FIG. 7, is the other component of absolute RPM. It represents the subcylic speed fluctuations due to dynamic events occurring within the engine. It does not include the static RPM. The terms absolute and subcylic speed or angular velocity will be used herein interchangably and sometimes together to indicate absolute RPM including subcylic variations.

In order to provide an accurate absolute compression test method an engine model is first required. The general equation describing the individual cylinder volume as a function of crankshaft angle ($\theta$) is (refer to FIG. 8):

$$V_\theta = A_p (X_{max} - X_\theta) + V_{CL}$$

$$= A_p \left\{ \left[ R + C_T + \frac{S}{(C_R - 1)} \right] - [\sqrt{R^2 - (C_T \sin \theta)^2} + C_T \cos \theta] \right\}$$

where,
B = cylinder bore,
S = stroke,
R = connecting rod length
$C_R$ = compression ratio
$A_p$ = piston area,
$C_T$ = crank throw, $$V_{CL} = \text{clearance volume} = A_p \left[ \frac{S}{C_R - 1} \right]$$

$V_{SWEPT}$ = swept volume = $A_p$ [S],
$V_{TOT}$ = total volume = $V_{SWEPT} + V_{CL}$, $$X_\theta = \sqrt{R^2 - (C_T \sin \theta)^2} + C_T \cos \theta, \text{ and}$$

$$X_{MAX} = R + C_T.$$

Figure 8:
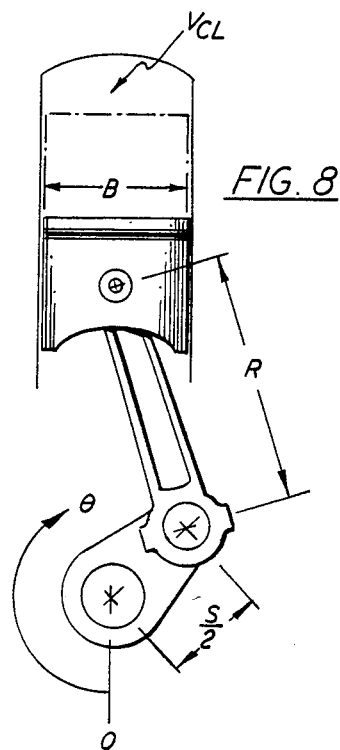
FIG. 8 is an illustration of a typical piston-cylinder arrangement for an internal combustion engine which illustration may be used as an aid in understanding the cylinder volume calculations disclosed herein.

A sketch showing the relationship of crankshaft angle to cylinder volume is shown in FIG. 8. The cylinder compression pressure as a function of theta was then calculated assuming an adiabatic expansion and compression process. The compression and expansion pressures were calculated assuming that the compression process began at the closing of the exhaust valves and ended at the opening of the exhaust valves. The pressure was calculated according to the relation:

$$P_\theta = P_o \left[ \frac{V_o}{V_\theta} \right]^\gamma,$$

Where
$V_\theta$ = cylinder volume as a function of $\theta$,
$V_o$ = cylinder volume at exhaust valve closing ATDC,
$P_o$ = atmospheric pressure,
$P_\theta$ = cylinder pressure as a function of $\theta$, and
$\gamma$ = ideal gas constant.

Figure 9:
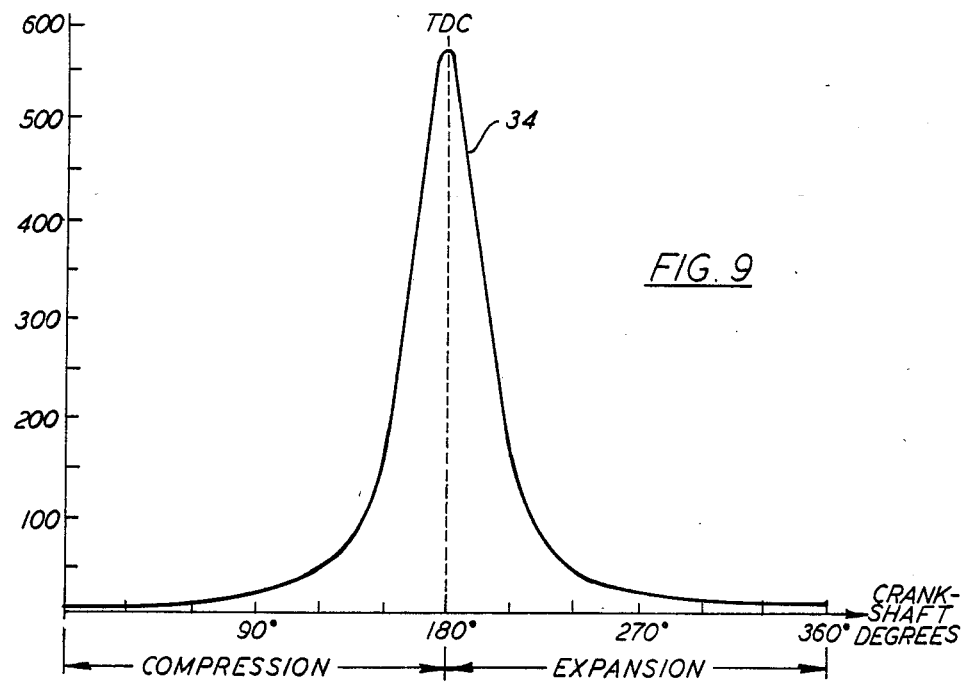
FIG. 9 is an illustration of a cylinder pressure waveform expressed in PSI versus crankshaft degrees.

A waveform 34 respresenting the compression and expansion pressure a single cylinder is shown in FIG. 9. The cylinder pressure data was then used to calculate the resultant flywheel torque as a function of theta.

Figure 10:
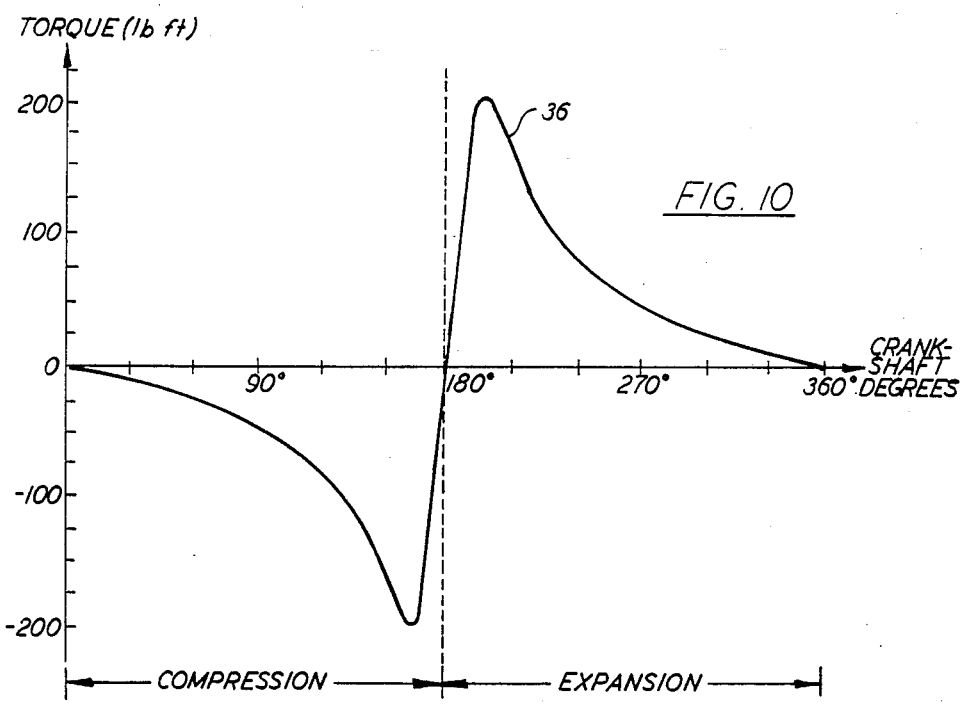
FIG. 10 is an illustration of a single cylinder torque waveform.

The waveform 36 representing the flywheel torque produced by a single cylinder is presented by in FIG. 10. The torque is calculated according to the relation $$T = F\left(\frac{S}{2} \text{ SIN } \theta\right) = P_\theta A_p \left(\frac{S}{2} \text{ SIN } \theta\right).$$

Notice that the torque is negative prior to TDC due to the gas compression process. It is zero at TDC because the connecting rod is radially aligned with the crankshaft throw and is positive after TDC due to the expansion of the compressed gas.

Figure 11:
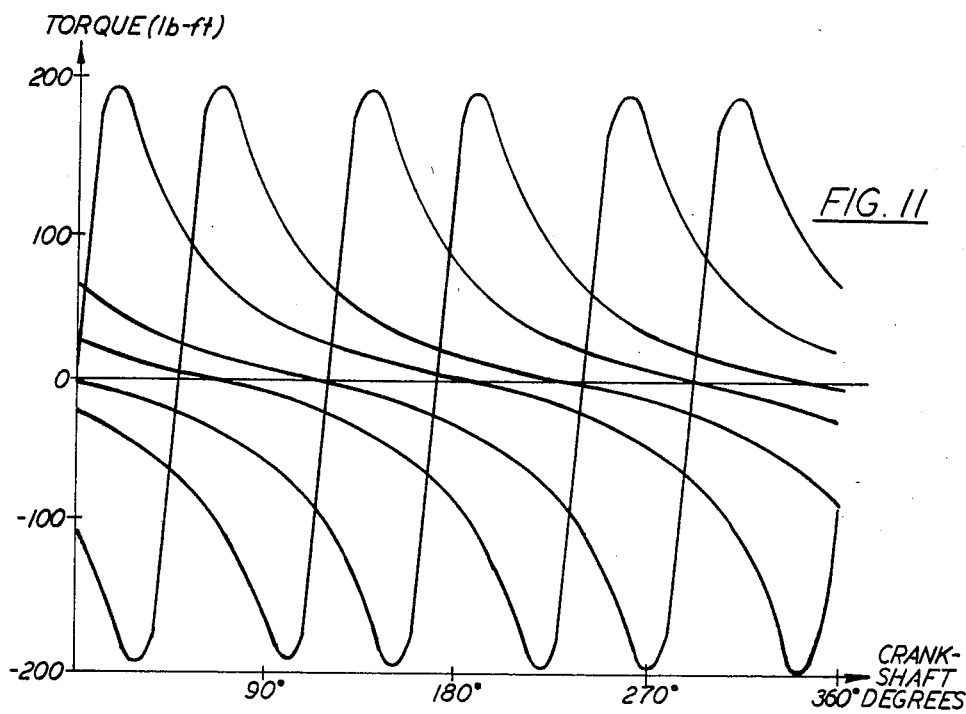
FIG. 11 is a torque overlap waveform showing each of the six cylinders' torque waveforms for the engine of FIGS. 1, 2, and 3.

FIG. 11 depicts the overlaying of the individual torque cylinder waveforms. Because the 6V-53 engine is a two stroke, all six cylinders complete their cycles within 360° of crankshaft rotation. Notice the severe overlapping of the individual cylinder torque waveforms. This overlapping is responsible for some of the difficulties associated with collecting data without confusion and also points to the need of examining more than one speed fluctuation in order to determine a given cylinder's absolute compression.

Figure 12:
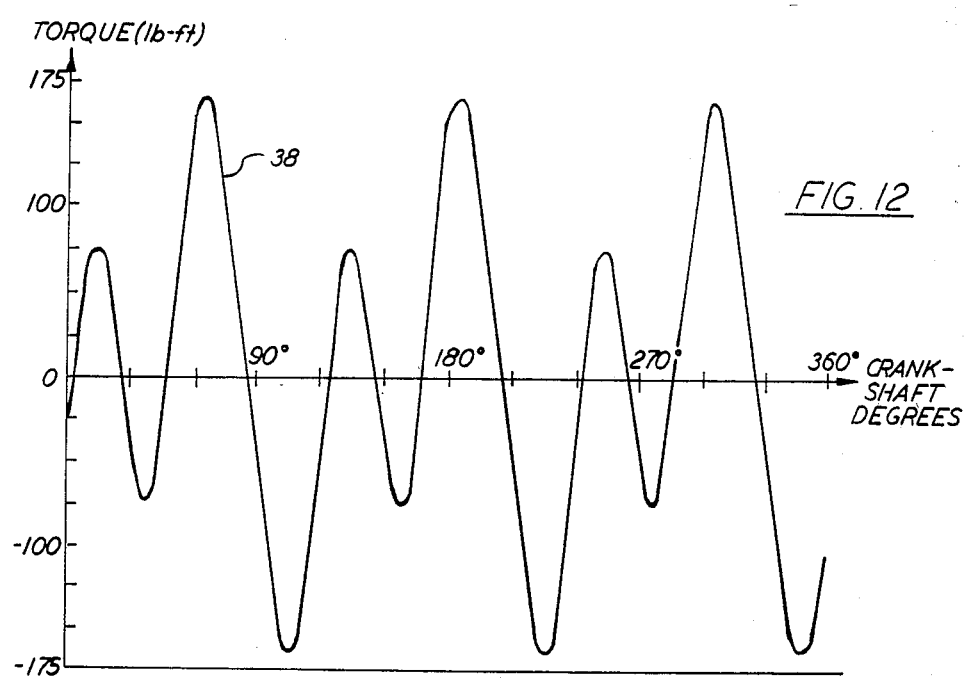
FIG. 12 is a torque summation waveform which represents the summation of all of the overlapped torque waveforms of FIG. 11.

FIG. 12 depicts the algebraic summation of the individual cylinder torque waveforms. As can be seen by inspecting the summed waveform 38, the overlapping of the individual torque waveforms results in torque fluctuations that represent the effects of more than one cylinder. Note that the amplitudes of the waveform 38 are non-symmetrical due to the odd geometry of the engine.

The torque summation data presented in FIG. 12 was used to calculate a flywheel speed fluctuation waveform according to the equation:

$$\int_{\theta_1}^{\theta_2} Td\theta = \frac{1}{2} I(\omega_2^2 - \omega_1^2)$$

Where
I=inertia,
ω=angular velocity, and
T=torque.

Figure 13:
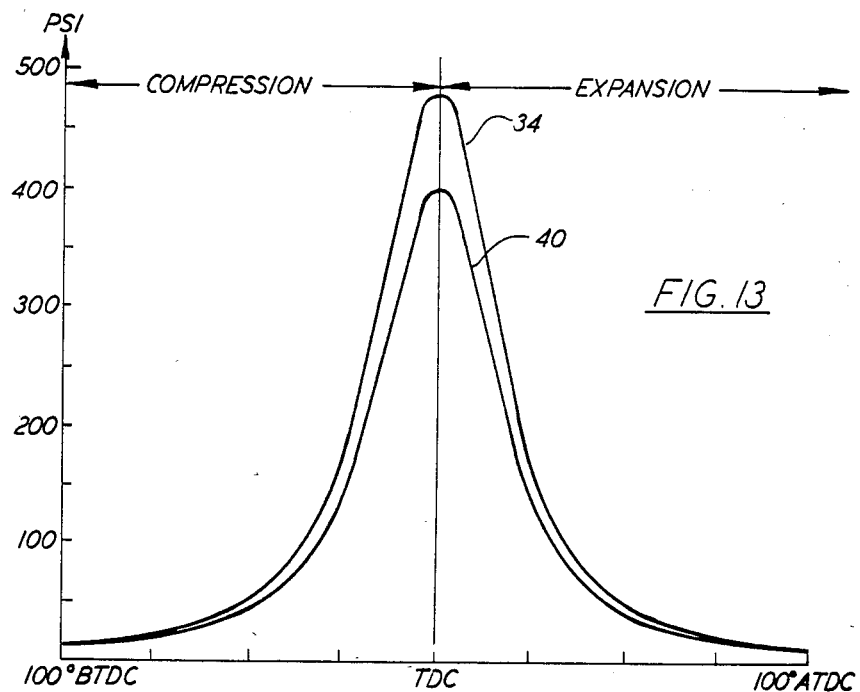
FIG. 13 shows a normal pressure waveform and faulted pressure waveform on the same graph.

The theoretical speed fluctuation waveform 28 was presented in FIG. 6 with the TDC for each cylinder indicated on the figure. An inspection of FIG. 6 reveals that TDC for the left bank cylinders occurs precisely at a speed fluctuation minimum point. For right bank cylinders TDC occurs slightly after the speed fluctuation minimum point. Were this an engine with symmetrical TDC intervals, TDC would always occur at a speed fluctuation minimum point. An inspection of FIG. 6 also reveals that there is no overall speed drop during the 360° of crankshaft rotation. Although the absolute compression test according to the present invention is conducted during an engine deceleration run, frictional effects will not be considered. The model also assumes an adiabatic compression and expansion process whereby all the energy of compression is returned during the expansion stroke. Finally, it should be observed that while the speed droop prior to TDC for each cylinder in FIG. 6 is due primarily to the compression stroke of an associated cylinder the compression and expansion torques of preceding and following cylinders also effect the speed fluctuation. This phenomena is due to the fact that the individual cylinder torque waveforms overlap to a significant degree. Thus, it should be understood that the compression process for a given cylinder occurs during approximately the 100° of crankshaft rotation prior to TDC and the expansion process occurs during the 100° of rotation after TDC. With the establishment of an engine model that represents the flywheel speed fluctuation of an ideal engine, simulated faults were then inserted into the engine model. Realistic compression faults can be inserted into the engine model by simply assigning a multiplying fault factor to the pressure data for any of the cylinders. An inspection of FIG. 13 reveals that the cylinder compression pressure waveform 40 of a faulted cylinder is of the same characteristic shape as the non-faulted pressure waveform 34. Although this scheme is not technically rigorous it does provide an effective means to evaluate faulted cylinders.

Faults of 10, 20, 30 and 40% were applied to cylinder 2R of the engine model. This was accomplished by assigning fault factors of 0.9, 0.8, 0.7, and 0.6, respectively, to the pressure data for that cylinder. The resultant flywheel speed fluctuation waveforms (including a non-faulted waveform 42) are depicted in FIGS. 14–18. A 10% faulted waveform 44 is presented in FIG. 15. A 20% faulted waveform 46 is presented in FIG. 16. A 30% faulted waveform 48 is presented in FIG. 17. A 40% faulted waveform 50 is shown in FIG. 18. Piston top dead center for each of the cylinders is indicated on each of the figures. An inspection of the figures indicates that as the severity of the fault is increased the perturbation to the speed waveform becomes more pronounced. Furthermore, it should be apparent that even though the faulted cylinder is cylinder 2R, portions of the waveform associated with other cylinders are affected by the fault. Also, notice that the fault significantly affects the cylinders immediately preceding and following the faulted cylinder. The reason is that the cylinder with diminished compression exerts a diminished negative torque during compression and also a proportionally diminished positive torque during expansion. Since the torque waveform for any given cylinder overlaps the torque waveforms of preceding and following cylinders, the flywheel speed fluctuations of these cylinders are affected by the fault. It should also be noted that the perturbations that occur prior to the fault are primarily the result of the reduced compression torque of the faulted cylinder and perturbations that occurs after the fault are primarily the result of reduced expansion torque in the faulted cylinder.

The faulted flywheel speed fluctuation data was analyzed by calculating the work required to cause the speed change between the speed maxima prior to piston top dead center and the speed minima at top dead center for each cylinder. This is the flywheel speed change that occurs during the compression process. The work required to cause the speed change between the speed minima at TDC and the speed maxima following TDC was also analyzed. The work in each case was determined by computing the change in rotational kinetic energy of the engine according to the following equation:

$$W = \int_{\theta_1}^{\theta_2} Td\theta$$

where W=work, $$Td\theta = \frac{1}{2} I(\omega_2^2 - \omega_1^2),$$

I=inertia,
$\omega_1$=RPM maxima BTDC, and $\omega_2$ = RPM Minima at TDC.

The results of these calculations are presented in Table I. Although the calculations are not strictly indicative of the actual work of compression and expansion they can be utilized to extrapolate to the actual values as will be discussed below.

diminished extent. The effect on cylinder 1L is seen to be almost negligible from FIG. 19.

For cylinders following the faulted cylinder an opposite trend can be seen. In this case the work of compression appears to increase as shown in the waveform 62 because it is opposing less positive expansion torque and

TABLE I

WORK OF COMPRESSION AND EXPANSION OF SINGLE FAULTS

| | 1L | | 3R | | 3L | | *2R | | 2L | | 1R | |
|---|---|---|---|---|---|---|---|---|---|---|---|---|
| % FAULT | COMP | EXP | COMP | EXP | COMP | EXP | COMP | EXP | COMP | EXP | COMP | EXP |
| WORK OF COMPRESSION AND EXPANSION | | | | | | | | | | | | |
| 0% | 24938 | 7392 | 7392 | 24938 | 24938 | 7392 | 7392 | 24938 | 24938 | 7392 | 7392 | 24938 |
| 10% | 25025 | 7538 | 7154 | 25832 | 23275 | 9796 | 5211 | 21624 | 27506 | 6742 | 7906 | 24526 |
| 20% | 25100 | 7683 | 6916 | 26715 | 21613 | 12213 | 3038 | 18303 | 30081 | 6114 | 8433 | 24153 |
| 30% | 25162 | 7840 | 6678 | 27601 | 19954 | 15139 | 1384 | 14989 | 32661 | 5472 | 8961 | 23759 |
| 40% | 25237 | 7986 | 6439 | 28489 | 18298 | 18373 | 237 | 12419 | 35767 | 4821 | 9477 | 23366 |
| CHANGE IN WORK OF COMPRESSION AND EXPANSION | | | | | | | | | | | | |
| NO FAULT | 0 | 0 | 0 | 0 | 0 | 0 | 0 | 0 | 0 | 0 | 0 | 0 |
| 10% | 87 | 146 | −238 | 894 | −1663 | 2404 | −2181 | −3314 | 2568 | −650 | 514 | −392 |
| 20% | 162 | 291 | −476 | 1777 | −3325 | 4821 | −4354 | −6635 | 5143 | −1278 | 1041 | −785 |
| 30% | 225 | 448 | −714 | 2663 | −4984 | 7747 | −6008 | −9949 | 7723 | −1920 | 1569 | −1179 |
| 40% | 299 | 594 | −953 | 3551 | −6640 | 10981 | −7155 | −12522 | 10829 | −2565 | 2085 | −1572 |

*CYLINDER 2R FAULTED
NOTE
THE FIGURES PRESENTED IN THESE TABLES ARE NOT IN UNITS OF WORK. TO CONVERT A FIGURE TO ENGINEERING UNITS OF WORK (Ft - LBF) MULTIPLY BY 0.00273.

Figure 19:
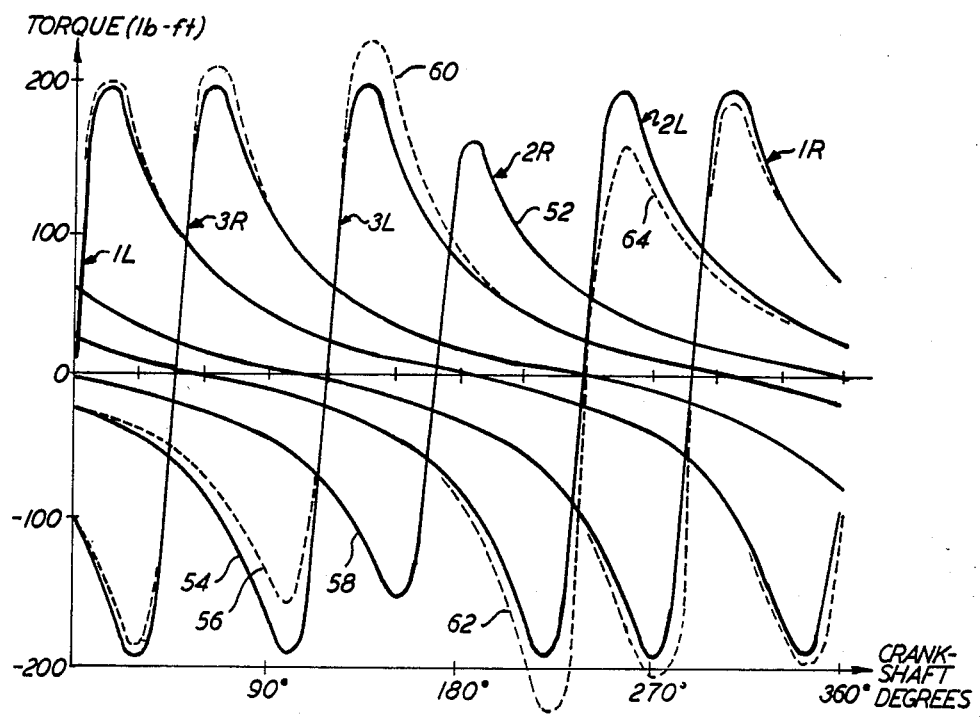
FIG. 19 is a torque overlap waveform for the engine of FIGS. 1, 2, and 3 in which cylinder 2R has a compression fault.

It is an important teaching of the present invention, as may be seen by an inspection of Table I, that the work of compression and expansion of faulted cylinder 2R decreases as the magnitude of the fault increases. Or, in other words, the work decreases as the cylinder pressure decreases regardless, as will be described below in connection with Table II, of apparent perturbations in other cylinders. Although the work of compression and expansion of the preceding and following cylinders is changed in a confused manner, a non-faulted cylinder will never exhibit a decrease in work for both expansion and compression. Table I clearly shows the effect of the faulted cylinder on the remaining cylinders. For cylinders preceding the faulted cylinder the work of compression appears to decrease because it is summed with less compression torque from the faulted cylinder and the work of expansion of the preceding cylinder appears to increase because it opposing less compression torque from the faulted cylinder. Referring to FIG. 19, the solid lines indicate, for each cylinder, the actual torque values for an engine in which all the cylinders are healthy except for cylinder 2R. Diminished peak values of both compression and expansion are evident in the waveform 52 for cylinder 2R. For cylinder 3L, immediately preceeding cylinder 2R, the true work of compression as shown by the lower portion of the waveform 54 appears to decrease as shown by waveform 56 because it is summed with less compression torque from the compression portion 58 of waveform 52. The work of expansion for cylinder 3L appears to increase as shown by waveform 60 because it is opposing less compression torque from the faulted cylinder. Inspection of Table I for cylinder 3L clearly reveals the apparent decrease in the work of compression and the apparent increase in the work of expansion for that cylinder. Of course, the true values of work for compression and expansion do not change. Although most of the apparent changes to otherwise healthy torque waveforms occur in cylinders immediatly preceding and following the faulted cylinder, it will be observed that cylinder 3R is affected in a similar manner to cylinder 3L except to the work of expansion appears to decrease as shown by waveform 64 because it is summed with less expansion torque from the faulted cylinder. It will also be apparent from an inspection of both Table I and FIG. 19 that the perturbations affecting following cylinders also increase with the cylinder's proximity to the faulted cylinder. Therefore, to repeat a central insight of the present invention, by calculating the work of compression and expansion for each cylinder of an engine and comparing that data to the work of compression and expanion of an ideal engine it is possible to positively identify a faulted cylinder because that cylinder will show a decrease in both the work of compression and expansion.

Once it is determined that a cylinder with diminshed compression can be identified, the data in Table I may be manipulated to establish a correlation between the absolute cylinder compression pressure and the work of compression and expansion of the faulted cylinder. Utilizing linear regression analysis an equation may be written that describes the cylinder compression pressure as a function of the work of compression or expansion. As an example, the equation relating cylinder pressure to compression work is presented below:

| FAULT | CYL PRESS | COMP WORK |
|---|---|---|
| 0% | 577 | 7392 |
| 10% | 520 | 5211 |
| 20% | 462 | 3038 |
| 30% | 404 | 1384 |
| 40% | 347 | 237 |

CYL PRESSURE = 0.0312 (COMP. WORK) + 354  Eq. 1

The correlation coefficent of the data is a near perfect 0.99. A similar equation can be written for the relationship between cylinder pressure and the work of expansion and that equation is as follows:

CYL PRESS = 0.0181 (EXP. WORK) + 127  Eq. 2

With the ability to determine the compression pressure of a faulted cylinder established, the problem of calculating the compression pressure of non-faulted cylinders arises. To accomplish this requires finding a relationship between the magnitude of a compression fault and the apparent change of work performed by a non-faulted cylinder.

Using linear regression analysis an equation which describes the apparent change in work of a non-faulted cylinder as a function of the work performed by a faulted cylinder may be written for each of the affected cylinders. Because the perturbations caused to non-faulted cylinders preceding the faulted cylinder are due primarily to the diminished compression work of the faulted cylinder and the perturbations caused to non-faulted cylinders following the faulted cylinder are due to the diminished expansion work of the faulted cylinder, the equations used to compensate non-faulted cylinders are a function of either the work of compression or the work of expansion of the faulted cylinder depending upon the relative position of the non-faulted cylinder in question. The data and the resulting equation relating the change in compression work of non-faulted cylinder, 3L as a function of the compression work of faulted cylinder 2R is presented below as an example of the compensating technique.

| FAULT % | COMP. WORK (2R) | COMP. WORK (3L) |
|---------|-----------------|-----------------|
| 0       | 7392            | 0               |
| 10      | 5211            | −1663           |
| 20      | 3038            | −3325           |
| 30      | 1384            | −4984           |
| 40      | 237             | −6640           |

$$\Delta \text{COMP. WORK (3L)} = 0.90(\text{WORK COMP. 2R}) - 6435 \qquad \text{Eq. 3}$$

The correlation coefficient of the data is 0.99 which indicates an almost perfect correlation. It should be noted that while the above equation describes the apparent change in compression work of preceding cylinder 3L as a function of faulted cylinder 2R the equation is equally valid when used to describe the change in work of any left bank cylinder when the following right bank cylinder is faulted. A similar equation with equal accuracy can be written for each of the perturbed cylinders as a function of the faulted cylinder. The remaining equations describing the apparent change in compression and expansion work of cylinders preceding a faulted right bank cylinder as a function of the faulted cylinder's compression work are as follows:

Preceding Left Bank Cylinder
Compression:

$$\Delta \text{WORK COMP.} = 0.9 \, (\text{WORK COMP.}) - 6435 \qquad \text{Eq. 4}$$

Expansion:

$$\Delta \text{WORK EXP.} = -1.359 \, (\text{WORK COMP.}) + 10046 \qquad \text{Eq. 5}$$

Preceding Right Bank Cylinder
Compression:

$$\Delta \text{WORK COMP.} = 0.129(\text{WORK COMP.}) - 923 \qquad \text{Eq. 6}$$

Expansion:

$$\Delta \text{WORK EXP.} = -0.4817(\text{WORK COMP.}) + 3440 \qquad \text{Eq. 7}$$

Equations describing the change in compression and expansion work of cylinders following a faulted right bank cylinder as a function of the faulted cylinder's expansion work are presented below:

Following Left Bank Cylinder
Compression:

$$\Delta \text{WORK COMP.} = -0.84(\text{WORK EXP.}) + 20811 \qquad \text{Eq. 8}$$

Expansion:

$$\Delta \text{WORK EXP.} = 0.2016(\text{WORK EXP.}) - 5003 \qquad \text{Eq. 9}$$

Following Right Bank Cylinder
Compression:

$$\Delta \text{WORK COMP.} = -0.1646(\text{WORK EXP.}) + 4080 \qquad \text{Eq. 10}$$

Expansion:

$$\Delta \text{WORK EXP.} = 0.1238(\text{WORK EXP.}) - 3071 \qquad \text{Eq. 11}$$

It is an important teaching of the present invention that since it is possible to calculate the magnitude of a perturbation caused to a non-faulted cylinder it is possible to subtract this value from the apparent work done by that cylinder and thus calculate the "actual" work done by the cylinder in order to determine the cylinder compression pressure.

The observations and conclusions made above with respect to a faulted right bank cylinder are equally valid for a left bank cylinder. An equivalent set of equations, slightly different due to the odd geometry of the engine under consideration, is presented below: Equations relating cylinder pressure to the work of compression and expansion of a faulted left bank cylinder:
Compression:

$$\text{CYL. PRESS.} = 0.0181(\text{COMP. WORK}) + 127 \qquad \text{Eq. 12}$$

Expansion:

$$\text{CYL. PRESS.} = 0.0312 \, (\text{EXP. WORK}) + 354 \qquad \text{Eq. 13}$$

Equations describing the change in compression and expansion work of cylinders preceding a faulted left bank cylinder as a function of the faulted cylinder's compression work:
Preceding Right Bank Cylinder
Compression:

$$\Delta \text{WORK} = 0.2028(\text{WORK COMP.}) - 5027 \qquad \text{Eq. 14}$$

Expansion:

$$\Delta \text{WORK} = -0.84(\text{WORK COMP.}) + 20781 \qquad \text{Eq. 15}$$

Preceding Left Bank Cylinder
Compression:

$$\Delta \text{WORK} = 0.1234(\text{WORK COMP.}) - 3068 \qquad \text{Eq. 16}$$

Expansion:

$$\Delta \text{WORK} = -0.1639(\text{WORK COMP.}) + 4065 \qquad \text{Eq. 17}$$

Equations describing the change in compression and expansion work of cylinders following a faulted left bank cylinder's expansion work:
Following right bank cylinder
Compression:

$$\Delta \text{WORK} = -1.467(\text{WORK EXP.}) + 10244 \qquad \text{Eq. 18}$$

Expansion:

$$\Delta \text{WORK} = 0.8985(\text{WORK EXP.}) - 6420 \qquad \text{Eq. 19}$$

Following left bank cylinder
Compression:

$$\Delta \text{WORK} = -0.4844(\text{WORK EXP.}) + 3461 \qquad \text{Eq. 20}$$

Expansion:

$$\Delta \text{WORK} = 0.1283(\text{WORK EXP.}) - 918 \qquad \text{Eq. 21}$$

Thus, to recap, by examining the work of compression and expansion of each individual cylinder it is possible to identify a faulted cylinder because it will display a decrease in both the work of compression and the work of expansion. Assuming there is only a single faulted cylinder, the cylinder compression pressure of that faulted cylinder can be calculated directly based upon an examination of the work of compression or expansion of the faulted cylinder. Additionally, the perturbations exhibited on non-faulted cylinders caused by a faulted cylinder can be compensated for, based upon the compression pressure of the faulted cylinder. Once normalized, the compression pressure of the non-faulted cylinders can be calculated.

Figure 20:
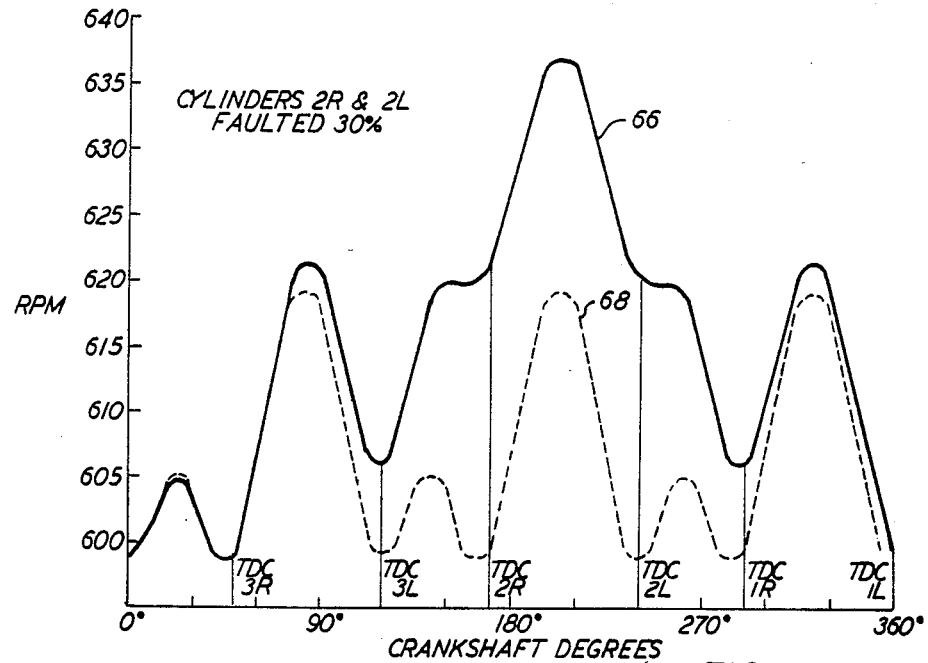
FIG. 20 is an illustration of the flywheel speed fluctuations in an engine in which cylinders 2R and 2L are each faulted 30%.

However, since it is unlikely to encounter an engine with equal cylinder compression pressure in all but one cylinder, the shortcomings of this type of analysis are obvious. Even in a "good" engine the chances are that the individual cylinder compression pressures will vary to some degree or, in other words, will have multiple faults. Because the number of possible compression fault combinations is virtually limitless, a single difficult combination of faults is presented below in order to show, to good effect, the concepts previously presented above. The multiple faults selected for evaulation will be two sequential cylinders in the firing order each with a large compression fault. Compression faults of 30% will be assigned to cylinders 2R and 2L of the engine model and the resultant flywheel speed fluctuation waveform is depicted in FIG. 20. As may be seen by inspecting FIG. 20, the flywheel speed waveform 66 is greatly perturbed compared to a non-faulted waveform 68. Because the two faulted cylinders are adjacent to each other and have equal magnitude faults the waveform appears symmetrical about the faulted cylinders. The work associated with the compression and expansion process of each of the cylinders is contained in Table II.

Work was calculated using the same work equation that was used previously:

$$W = \frac{1}{2} I(\omega_2^2 - \omega_1^2).$$

An inspection of Table II reveals that cylinders 2R and 2L both exhibit a decrease in the work of compression and expansion compared to a normal cylinder. Also notice that the cylinders preceding the faulted cylinders exhibit an apparent decrease in the work of compression and an apparent increase in the work of expansion. Cylinders following the faulted cylinders display an opposite trend. This is the same tendency that was displayed for single cylinder faults. Therefore, it is apparent that the technique of identifying a faulted cylinder based upon detecting a decrease in both the work of compression and expansion is a valid procedure for both single and multiple faults.

With the ability to identify faulted cylinders established, the problem of compensating the perturbations caused by the faulted cylinders arises. It is apparent that each of the faulted cylinders affects the waveform of the other faulted cylinder so that the assumption which was made above in the case of single cylinder fault that the work of compression and expansion could be calculated directly, cannot be made. In particular, the work of compression and expansion of cylinder 2L is perturbed by the reduced expansion torque of cylinder 2R, and the compression and expansion work of cylinder 2R is perturbed by the reduced compression torque of cylinder 2L. Therefore, it is not immediately possible to calculate the compression pressure of the faulted cylinders as was done during the single fault analysis above. Instead, the perturbations caused to each of the faulted cylinders by the other faulted cylinder must be eliminated before the magnitudes of the faults can be calculated.

The technique of eliminating the perturbations is an iterative process that utilizes the compensating equations disclosed above. The procedure is described below in a step by step fashion including the equations used in the process.

Step 1. - The first step in the process is to eliminate the effect that the expansion work of cylinder 2R has on the compression work of 2L. Therefore, equation 8 is used to compute the change in compression work of cylinder 2L and this value is subtracted from the work as listed in Table II:

$$\Delta \text{WORK COMP(2L)} = -0.84(\text{WORK EXP. (2R)}) + 20811$$
$$= -0.84(21699) + 20811$$
$$= 2584$$

TABLE II

WORK OF COMPRESSION AND EXPANSION OF MULTIPLE FAULT

|  | 1L | | 3R | | 3L | | 2R* | | 2L* | | 1R | |
|---|---|---|---|---|---|---|---|---|---|---|---|---|
|  | COMP | EXP | COMP | EXP | COMP | EXP | COMP | EXP | COMP | EXP | COMP | EXP |
| NO FAULT | 24938 | 7392 | 7392 | 24938 | 24938 | 7392 | 7392 | 24938 | 24938 | 7392 | 7392 | 24938 |
| FAULTED | 27810 | 6991 | 6991 | 27810 | 18773 | 17121 | 298 | 21699 | 21699 | 298 | 17121 | 18773 |
| WORK | 2872 | −401 | −401 | 2872 | −6165 | 9729 | −7094 | −3239 | −3239 | −7094 | 9729 | −6165 |

*CYLINDERS 2R AND 2L FAULTED 30%
NOTE
THE FIGURES PRESENTED IN THIS TABLE ARE NOT IN UNITS OF WORK. TO CONVERT A FIGURE TO ENGINEERING UNITS OF WORK (Ft - LBF) MULTIPLY BY 0.00273

1st CORRECTED WORK OF COMP(2L)=21699−2584=19115.

Step 2. - The corrected value for the work of compression of cylinder 2L is used to obtain corrected values for the work of compression and expansion of cylinder 2R. Equations 14 and 15, above, are used to compute the changes in compression and expansion work and these values are subtracted from the work of compression and expansion of cylinder 2R as listed in Table II.

```
ΔWORK COMP(2R) = 0.2028(WORK COMP(2L)) − 5027
               = 0.2028(19115) − 5027
               = 1151
ΔWORK EXP(2R)  = −0.84(WORK COMP(2L)) + 20781
               = −0.84(19115) + 20781
               = 4724
CORRECTED WORK COMP(2R) = 298 − (−1151)
                        = 1449
CORRECTED WORK EXP(2R)  = 21699 − 4724
                        = 16972
```

Step 3. - Step one is repeated. However, instead of using the value for the work of expansion of cylinder 2R from Table II, the value for the corrected work of expansion of cylinder 2R from step 2 is used to calculate a corrected change is compression work of cylinder 2L. This value is then subtracted from the work of compression of cylinder 2L as listed in Table II.

```
ΔWORK COMP(2L) = −0.84(WORK EXP(2R)) + 20811
               = −0.84(16792) + 20811
               = 6555
2nd CORRECTED WORK  = 21699 − 6555
    COMPRESSION(2L)
                    = 15145
```

Step 4. - The effect of each of the faulted cylinders caused to the work of compression of the other faulted cylinder has been eliminated and is represented by the corrected work of compression in steps 2 and 3 for the respective cylinders. Therefore, these corrected values of compression work can now be used to compute the compression pressure of each of the faulted cylinders using equations 12, 13 above:

```
CYL. PRES. (2R) = 0.0312(WORK COMP(2R)) + 354
                = 0.0312(1449) + 354
                = 399 PSI
CYL. PRES. (2L) = 0.0181(WORK COMP(2L)) + 127
                = 0.0181(15145) + 127
                = 401 PSI
```

Recalling that about a 30% compression fault was applied to both cylinders 2R and 2L, the expected compression pressure would be 404 PSI for each cylinder. Using the above equations the calculated cylinder pressures are 399 and 401 PSI for cylinder 2R and 2L, respectively. These figures represent an error of approximately 1%.

After identifying multiple faults and calculating the magnitude of the faults, the problem is to compensate for the perturbations caused to non-faulted cylinders by the faulted cylinders. the technique is fairly simple to understand after one realizes that the total perturbation caused to a non-faulted cylinder is equal to the summation of the perturbations caused by each of the faulted cylinders. Therefore, to compensate a non-faulted cylinder all that is required is to calculate the apparent changes in work caused to each non-faulted cylinder by each of the faulted cylinders and subtract these apparent changes in work from the total work calculated from the flywheel speed fluctuation waveform. This procedure is performed for each of the non-faulted cylinders in order to normalize the flywheel speed fluctuation waveform. Once the waveform is normalized the compression pressure of each of the non-faulted waveforms can be calculated. Thus, it will be appreciated as a result of the above analysis that a thorough understanding of the compression process and the resultant flywheel speed fluctuations leads to the following observations:

(1) It is possible it identify a faulted cylinder by examining the work of compression and expansion as calculated from the absolute flywheel speed fluctuation waveform. This is possible because only a faulted cylinder will display a decrease in both the work of compression and expansion. The technique is valid for multiple as well as single cylinder compression faults.

(2) There is a constant relationship between the magnitude of a compression fault and the flywheel speed perturbations caused to other non-faulted cylinders. It is therefore possible to subtract the effects of faulted cylinders from non-faulted cylinders once the magnitude of the fault is known.

(3) There is a constant relationship between the work of compression and peak cylinder compression pressure. The relationship is such that the individual cylinder compression values can be calculated from the flywheel speed fluctuation data after the data has been compensated to eliminate the perturbations caused by faulted cylinders.

An absolute compression test may therefore be achieved assuming the absolute flywheel speed can be measured with sufficient accuracy. However, it should be noted that the above conclusions are subject to the limitations of the engine model in that the engine model does not consider inertial torque or engine friction. Inertial torque does not present a major obstacle since the mass of the pistons and connecting rods is virtually constant for a given engine model. Engine friction friction may pose a serious problem if there is a great deal of frictional variation between engines. Frictional effects may be minimized by performing the compression test at a minimum engine speed and at normal operating engine temperatures. The angular velocity peak to valley deltas are relatively larger as the engine slows down.

Figure 1:
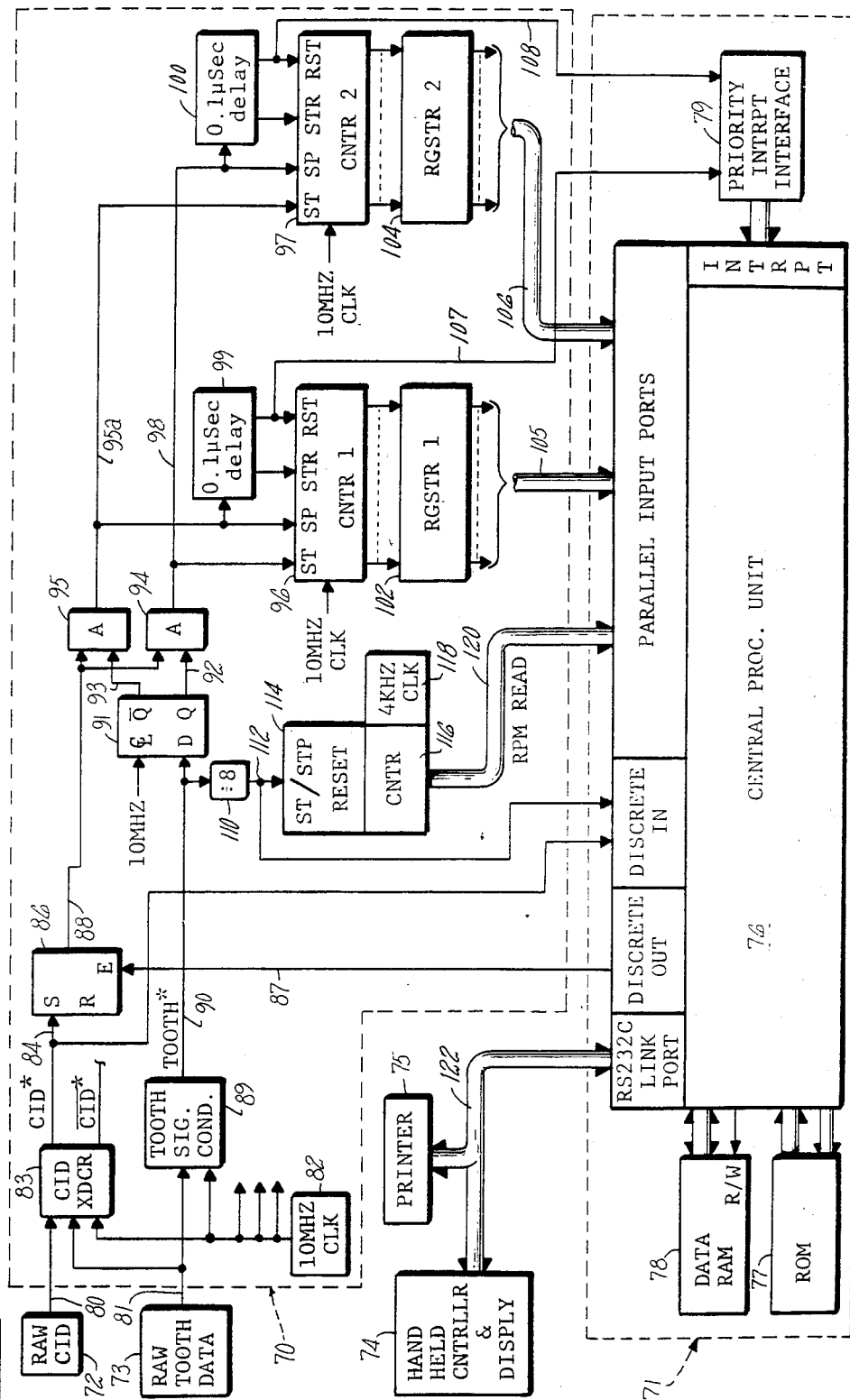
FIG. 1 is a system block diagram illustration of one embodiment for measuring absolute compression of an internal combustion engine according to the present invention.

Referring now to FIG. 1, in a best mode embodiment for carrying out the invention, apparatus for measuring electronically the absolute compression of an asymmetric IC engine includes: data acquisition unit 70, a digital signal processor 71, a proximity sensor 72 such as Electro Corporation Model 4947 Proximity Switch for measuring engine cylinder identification (CID), a proximity sensor 73 such as Electro Corporation RGT Model 3010-AN Magnetic Proximity Sensor for sensing the passage of the engine flywheel teeth, and a hand held controller 74 similar to that described in U.S. Pat. No. 4,113,980 of common assignee herewith, issued to M. Bell. The apparatus may also include a line printer 75. It should be understood that the data aquisition unit 70 and the signal processor 71 could interface as easily with many other types of user control and display devices besides the hand held controller and display 74 and the printer 75. For example, the graphical display of engine cylinder parameters such as described in U.S. Pat. No. 4,417,467 of common assignee herewith, to Higgs et al, could be adapted for use with the portable probe carrier described in U.S. Pat. No. 4,470,016 of common assignee herewith, to Palmer for display of compression pressure.

The signal processor 70 includes: a central processing unit (CPU) 76 (such as the 16 bit Intel 8086), a read only memory ROM 77, a random access memory (RAM) 78, and priority interrupt interface 79, all of which is described in detailed operation hereinafter.

The proximity sensor 72 which provides raw engine CID data and the sensor 73 providing raw engine tooth data are installed on the engine in the same manner described in the hereinbefore referenced patent to Benedict, and each provide the raw data on lines 80, 81 to the data acquisition unit 70. The raw CID data, the raw tooth data, and the signal from a high frequency clock 82 (typically 10 Mhz) are presented to a CID transducer 83, such as that described in U.S. Pat. No. 4,043,189 of common assignee herewith, to R. Tedeschi, which provides a signal conditioned CID (CID*) and a not CID* on lines 84, 85 to a gate enabled latch 86. The latch, in the presence of a gate enable signal from the signal processor on a line 87 to the Enable input thereof, provides a latched logic one signal on an output line 88 on the rising edge of the first CID* pulse appearing after enabled, and resets to zero with removal of the enable gate.

The raw tooth signal data is a series pulse stream. Each pulse represents the passage of a ring-gear tooth past a reference point as the engine crankshaft rotates. The total number of teeth ($T_c$) on the ring-gear varies with engine type and the angle interval between teeth is equal to $360°/T_c$. The raw tooth signals are conditioned by signal conditioning circuitry 89, similar to that of the CID transducer 83, which provides conditioned tooth (TOOTH*) signals on a line 90 to a divide-by-two frequency divider 91, such as a D edge triggered flip-flop, which provides Q (line 92) and not Q (line 93) output signals at one half the TOOTH* signal frequency to an associated one of the AND gates 94, 95. The AND gates also receive the output from the latch 86 on the line 88 and, in combination, provide the enable/disable control of 16 bit binary counters 96, 97. This is provided by presenting the output of AND gate 94 through a line 98 to start (ST) input of counter 96 and the stop (SP) input of counter 97, and presenting the output of AND gate 95 through a line 95a to the SP input of counter 96 and the ST input of counter 97. In operation the alternating Q, not Q signals are ANDed with the output from the latch 86, to provide alternate enabling of the counters 96, 97 on alternate TOOTH* signal intervals. The counters 96, 97 count the number of 10 Mhz clock signals appearing within the corresponding TOOTH* signal interval, each counter enabled or disabled alternately on the rising edge of each successive TOOTH* signal. The output from each counter represents a manifestation of the time period of the tooth interval, i.e., the number of known frequency clock pulses within each interval, which can be used with the known angle between teeth to determine the absolute RPM of the engine.

The stop (SP) signal to each counter from the gates 94, 95 are also presented to an associated one-shot monostable 99, 100 which after the delay period (typically one clock period, or 0.1 Sec) provide a strobe (STR) to the associated counter which transfers the count data into the associated one of two buffer registers 102, 104, the outputs of which are connected through lines 105, 106 to the processor. Following the strobe each delay provides a counter reset of the associated counter which may also be provided as a discrete "DATA READY COUNTER 96 (97)" signal on lines 107, 108 respectively to the priority interrupt interface 79 of the processor. The DATA READY discretes may alternately be provided as discrete input signals directly to the CPU 52 if desired by providing for the CPU read of these discretes. The use of the priority interrupt simply allows for the time variations between data readouts as required by variations in engine deceleration speed. The count data strobed into each register 102, 104 is written over the previously stored data, such that no reset of the registers is required.

Since the absolute compression test depends on measurement of speed changes occurring during compression or expansion stroke of the engine cylinders the engine deceleration speed must be above some minimum deceleration speed data acquisition to allow accurate absolute compression measurement. The data acquisition hardware provides an average RPM speed indication by presenting the TOOTH* signals on line 90 to the input of a divide-by-eight frequency divider 110 (typically includes four cascaded bistable devices) which provides the one eighth TOOTH* frequency signal on an output line 112 to the input of a decode 114. The decode provides start (ST), stop (STP) gates coincident with the rising and falling edges of the divide-by-eight output signal to a counter 116, which, when enabled, counts clock pulses from an associated low frequency clock 118 (typically 4 KHz) and provides on lines 120 the clock count corresponding to alternate eight TOOTH* signal intervals. This count provides a manifestation of the average speed, i.e., a time count which is equal to 1/RPM. The divide-by-eight output on lines 112 is also presented to a discrete input of the CPU 52 which looks for the falling edge as an indication that the counter output is ready to be read. The counter 116 may be reset within one clock period preceding the start, such that the data remains on the line 120 for essentially a full eight tooth interval.

The CPU 76 provides the discrete output enable signal on the line 87 as described hereinbefore. The discrete provided on the line 87 is a DATA ACQUISITION ENABLE. As known, the CID provides a crankshaft index which allows identification of each cylinder in the firing order. This permits readout of the absolute compression of identified cylinders. Communication between the CPU and the hand held controller 74 is provided through lines 122 connected between the controller and an RS232C link port on the CPU. This is a two-way communication port permitting communication between the operator and the test apparatus whereby the operator can, through the controller keyboard, command the start of, or changes in, the data acquisition and absolute compression measurement routines performed by the CPU. The line printer 75 is similarly connected to the RS232C port of the CPU through the lines 122.

Figure 5A:
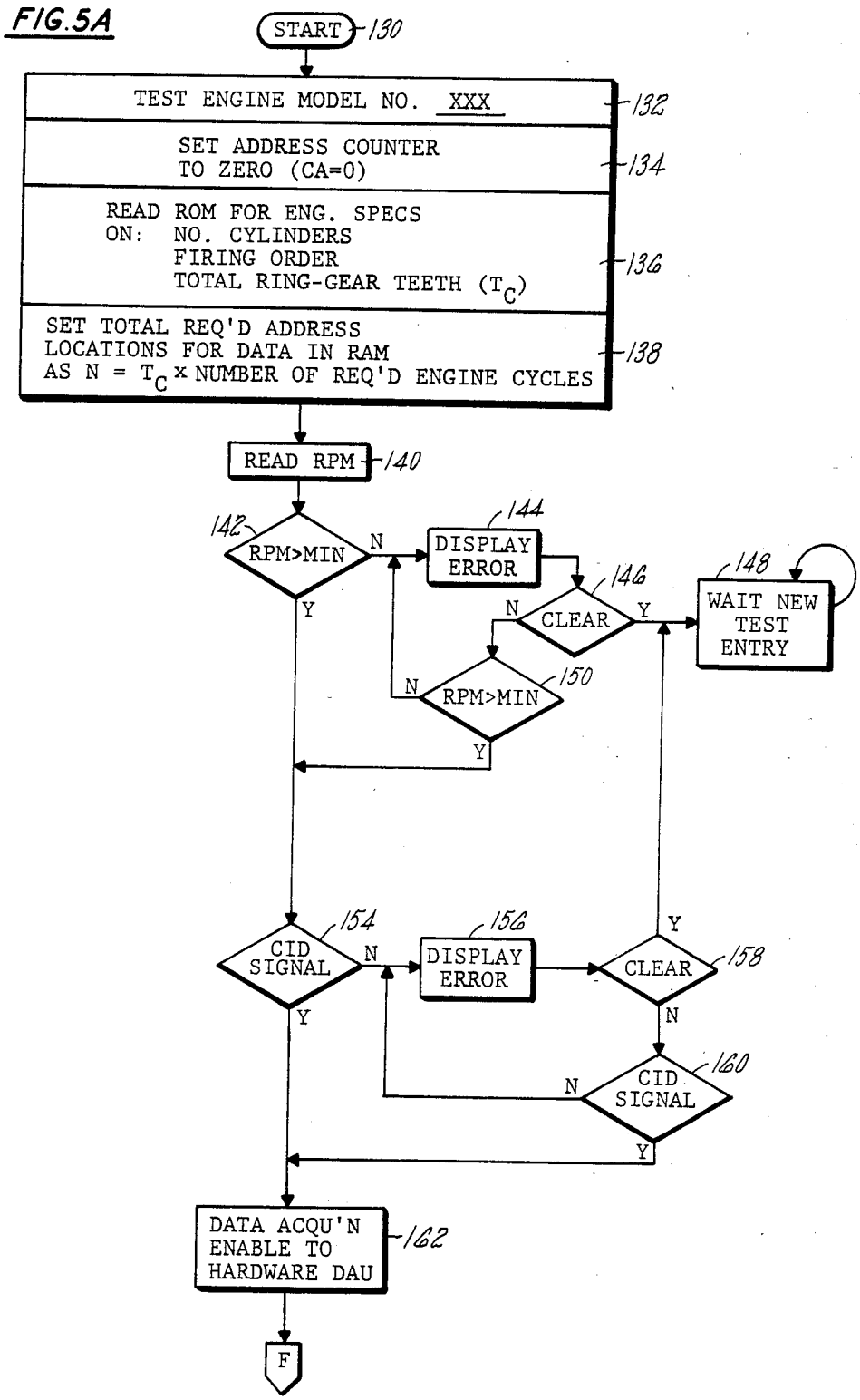

Referring simultaneously to FIGS. 1 and 5A the absolute compression measurement routine begins with operator entry into the controller keyboard of a START command in instruction 130 and model identification information for the engine under test in instructions 132. The CPU next executes instructions 134 setting of the CPU address counter to zero ($C_A=0$). Instructions 136 next request the CPU read of the specifications for the identified engine which are stored in the ROM 77, the instructions 138 determine the total number of address locations required in RAM (78) for data storage as the product of the specified number of ring-gear teeth multiplied by the number of engine cycles of data to be acquired (in a diesel decelerating engine application a single cycle is usually sufficient). Instructions 140 request a read of the decelerating RPM on the lines 120 following the presence of a discrete RPM read on the lines 112. Decision 142 asks whether or not deceleration RPM is greater than a selected minimum deceleration speed, and if not, then the test routine is held in a loop awaiting either an operator CLEAR of the test, or the minimum RPM value. This is provided by instructions 144 which display an error to the controller followed by instructions 146 asking whether or not an operator CLEAR has been made. If so, then the CPU waits for a new operator test entry in instructions 148. In the absence of an operator CLEAR instructions 150 again ask if measured RPM is greater than the minimum and if not, the CPU again cycles the loop by again displaying a keyboard error in instructions 144. The CPU processor will sit within the loop until either a CLEAR by the operator, or the pressure of a deceleration speed above minimum.

If RPM is above minimum, in either instructions 142 or 150, the CPU next executes instructions 154 to determine if a CID signal is actually present by a read of discrete input line 84 to look for the presence of a CID* signal. Since the CID* appears only once per engine cycle, if not present due to an intracycle read or due to error, the CPU again falls into a waiting loop (instructions 148) after first displaying an error in instructions 156 and determining whether or not an operator CLEAR has been made in instructions 158. If there is not CLEAR the CPU again looks for the presence of CID* signal in instruction 160. Following the presense of a CID* in either instructions 154 or 160 the CPU provides in instruction 162 a DATA ACQUISITION ENABLE gate signal through the line 87 to the latch 86, thereby enabling data acquisition by the hardware.

Figure 5B:
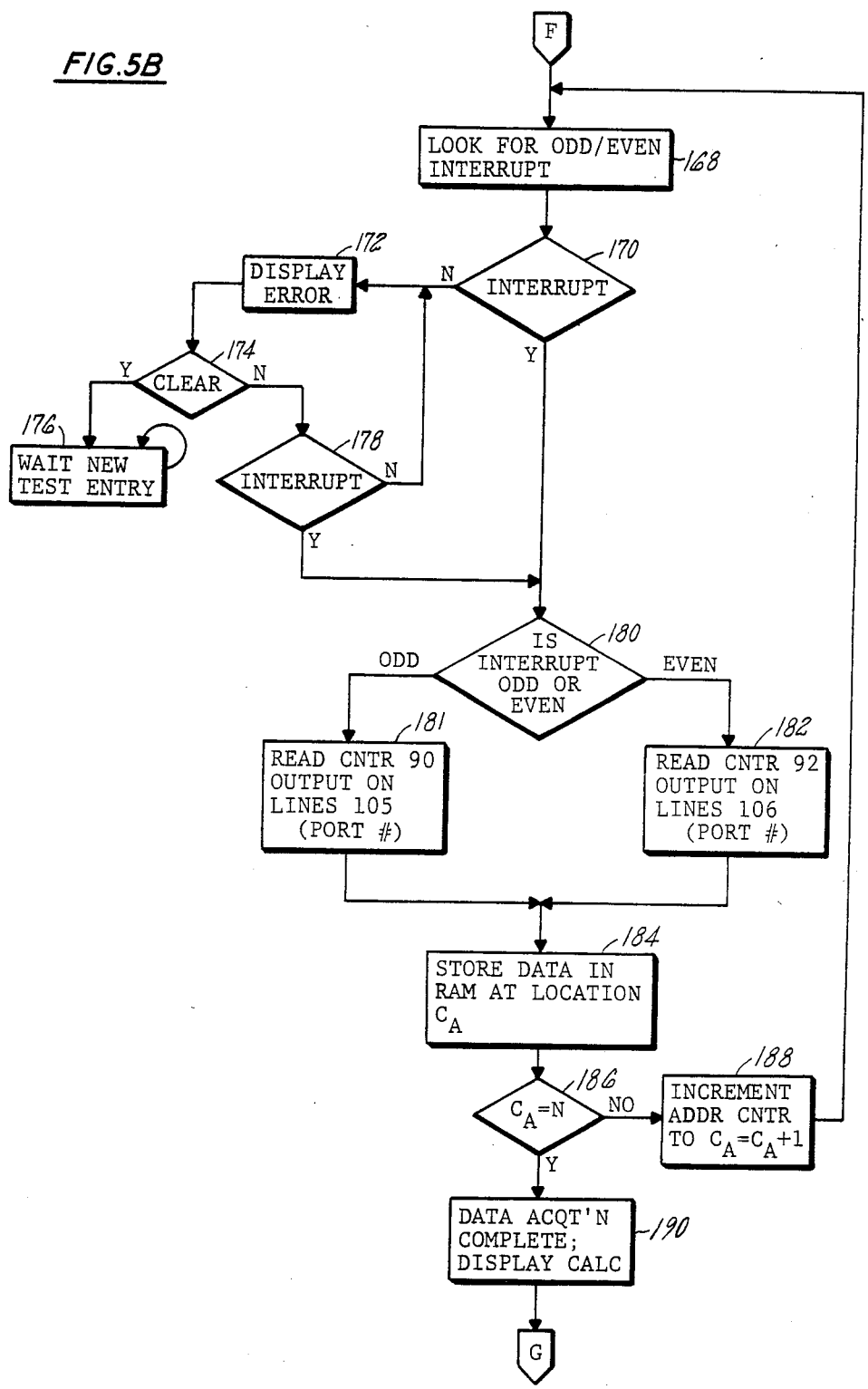

Referring now to FIG. 5B in the routine performed by the CPU in acquiring the count data from the data acquisition unit instructions 168 command the CPU to look for odd/even interrupts, i.e., the line 107 (odd) or the line 108 (even) discrete indicating DATA READY COUNTER 96 (97). Instructions 170 ask whether an interrupt has been received and if NO the CPU agains falls into a waiting loop similar to that described hereinbefore for the RPM and CID* signal determinations. Instructions 172 request display of a keyboard error followed by instructions 174 which ask if an operator CLEAR has been made, and if YES has been made, and if YES than instructions 176 command the CPU to wait for a new test entry. In the absence of CLEAR, instructions 178 again ask if an interrupt is present. If NO, the keyboard error is again displayed. Following the presence of an interrupt in instructions 170 or 178, instructions 180 determine if the interrupt is odd (counter 96 or even (counter 97) decide which of the two data lines 105, 106 are to be read in instructions 181, 182. Instructions 184 define the data storage location in the RAM 78 beginning of the first tooth interval count of the first engine cycle as location $C_A$, after which instructions 186 determine if the location $C_A = N$, i.e., the total number of address locations for the total number of engine cycles of data to be stored indicating a complete data acquisition routine. If NO, instructions 188 increment the address counter by one after which the CPU returns to instructions 168 to look for the next succeeding interrupt. Following a YES answer to instructions 186 indicating that the full number of engine cycles of data have been received instructions 190 request a CPU discrete to the controller 74 to display an indication of the completion of data acquisition, such as CALC, thereby notifying the operator. Of course, it should be understood that a single set of data points from one cycle only may be acquired.

Following the data acquisition, with all the data points stored in the RAM 78, the data may be processed at any time. The engine cycle data stored in the RAM for the number of cycles requested, assuming a typical four engine cycle acquisition, is conditioned by the signal processor 71 to provide a referenced set of cycle data from which the absolute compression information may be obtained. The first step in conditioning is to obtain an average set of values for all of the cycles measured. Typically the data acquired varies from cycle to cycle due to variations in the deceleration speed and in the overall repeatability of the engine performance from cycle-to-cycle. Averaging the acquired cycles produces a referenced set of values which eliminates the variations. The second conditioning step is to provide low pass software filtering of the individual data points within the averaged cycle data set. This is required due to variations in the spacing of the ring-gear teeth due to wear and also manufacturing tolerance which produce variations in tooth intervals and consequently variations in clock counts. This results in what appears to be a high frequency distortion on the data waveform which may be eliminated by M point low pass filtering in the software. Each data point is read out of RAM together with M number of data points preceding and following the present data point. The data points are summed together, divided by the total number of data points and the resultant data value is read back into RAM at the same location. This produces an averaged, low pass filter waveform of data points which appears substantially "sinusoidal" from which the speed values may be calculated.

Figure 5C:
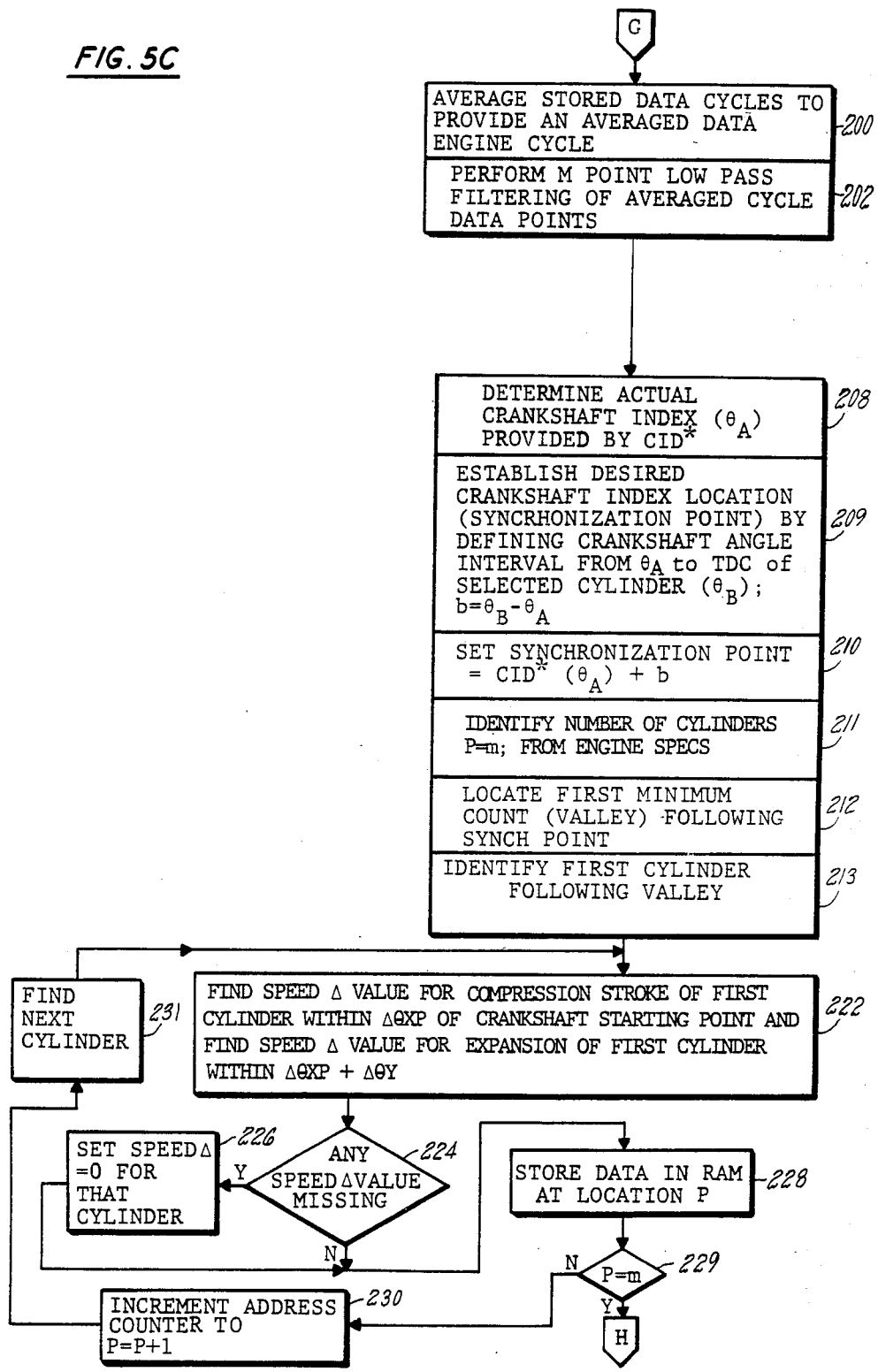

Referring now to FIG. 5C, the absolute compression calculation routine performed by the CPU begins with instructions 200 which request the averaging of the stored data cycles to provide the averaged data waveform, and instructions 202 next request the M point low pass filtering of the data points of the averaged waveform. The individual cylinders cannot be identified without a crankshaft angle index which establishes a reference point within the engine cycle from which the cylinders may be identified. Instructions 208–210 determine the crankshaft index location. A crankshaft index used to identify the cylinders may be any point selected from the cylinder firing order and is derived from the actual crankshaft location manifested by the CID sensor which generally defines a piston position other than TDC since the CID proximity sensor (72, FIG. 1) is typically installed in the valve cover of the engine in close proximity to the cylinder rocker arm (either exhaust or intake valve). In FIG. 6 the phantom line 210a defines an assumed crankshaft position represented by the actual CID signal which detects motion related to a cylinder. The crankshaft angle for the actual CID is $\theta_A$. The phantom line 210b defines a selected crankshaft index or synchronization point, as TDC of cylinder 1L located at a crankshaft angle $\theta_B$. The angular difference $\theta_B - \theta_A$ is a constant b stored in the ROM 77 and added to the actual CID* pulse received by the processor on the line 84 to obtain the selected synchronization point. This is performed by CPU instructions 208–210.

With the synchronization point available, instructions 211 ask for the number of cylinders (P=m). Instructions 212 locate the first minimum count (valley) following the synch point and instructions 213 identify the first cylinder.

Following instructions 213 the CPU scans the referenced waveform data points to determine the maximum and minimum speed values for the complete engine cycle. Instructions 222 request the determination of the speed values for the cylinder next following the synchronization point. This results in a speed change (count increase) coinciding with the compression stroke of the cylinder and a speed change coinciding with the expansion stroke of the cylinder. Instructions 224 request a determination of whether or not a value is missing for the cylinder. This is defined as the absence of a speed change within a specified angular interval of crank shaft rotation ($\Delta\theta$) from a preceding value, or as provided in the processor by a maximum number of TOOTH* intervals. If there is no discernable magnitude change in speed then instructions 226 require the value for that cylinder to be set at zero. If there is a detectable speed within the permitted crankshaft interval ($\Delta\theta$) the value is recorded as required by instructions 228. Following instructions 228 instructions 229 ask whether or not this is the last cylinder (P=m), and if not the CPU increments the address counter by one in instructions 230, selects next cylinder in instruction 231 and branches back to instructions 222 to find the speed values associated with the next cylinder.

Figure 5D:
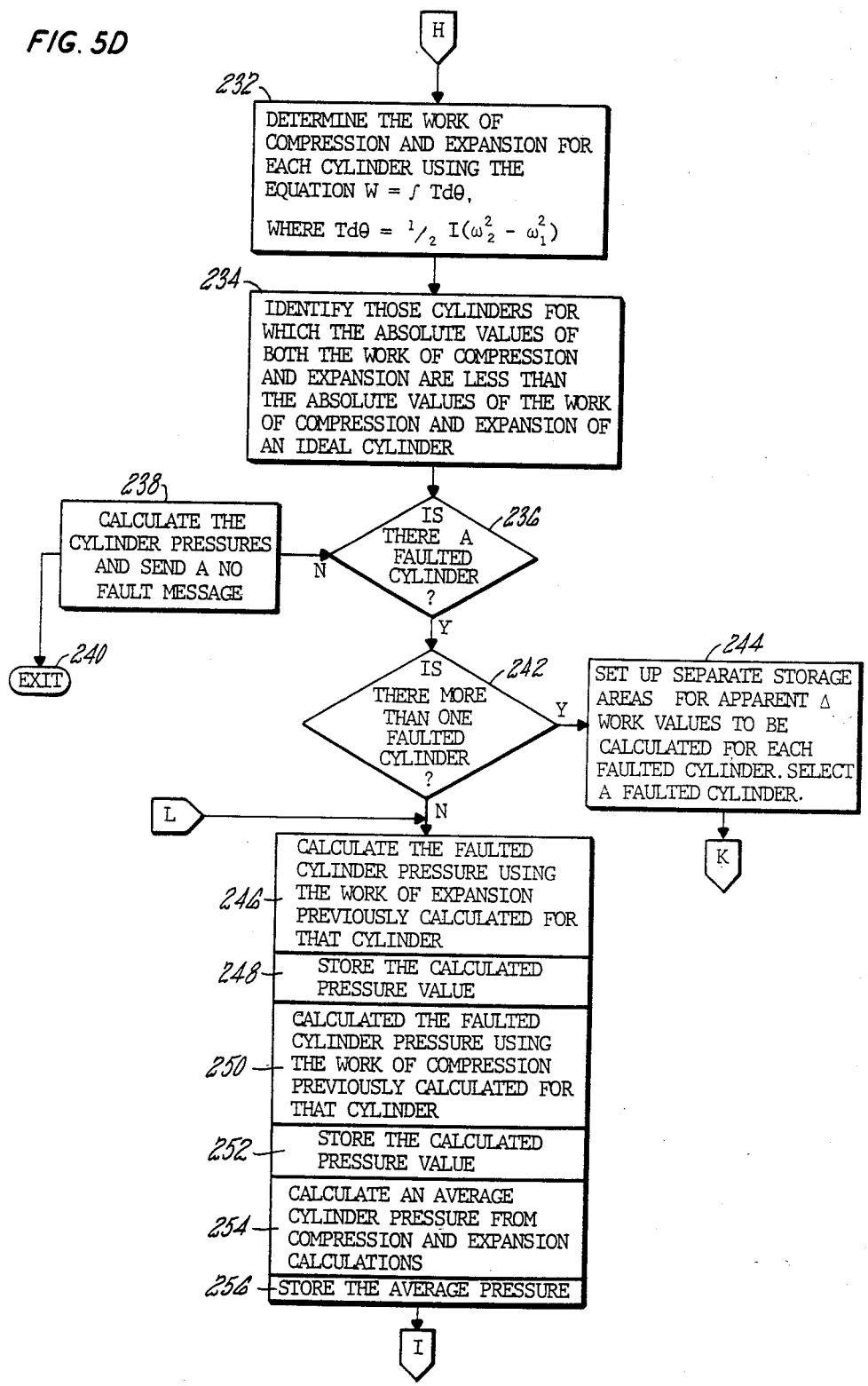

Referring now to FIG. 5D, a determination is then made of the work of compression and expansion for each cylinder using the equation $W = \sim Td\theta$, where $Td\theta$ equals $\frac{1}{2}I(\omega_2^2 - \omega_1^2)$. In other words, the routine seeks out and determines the peak to valley and valley to peak delta speed values for each cylinder in a given cycle. The results are tabulated and those cylinders for which the absolute values of both the work of compression and expansion are less than the absolute values of the work of compression and expansion of an ideal cylinder are identified in step 234. A determination is then made in a step 236 as to whether a faulted cylinder exists or not. If not, the cylinder pressures are calculated and a no fault message is sent on the lines 122 in a step 238. An exit is then made in a step 240. If a determination is made that a faulted cylinder exists then a decision is made in a step 242 as to whether there is more than one faulted cylinder. If so, separate storage areas are setup in a step 244 for the apparent delta work values to be calculated for each faulted cylinder. A faulted cylinder is then selected with which to begin the calculations to follow which will be described in more detail below in connection with FIG. 5E.

If there is only one faulted cylinder detected in step 242 a computational step 246 then calculates the faulted cylinder pressure using the work of compression previously calculated for that cylinder. The calculated pressure value is then stored in a step 248 for later use. The faulted cylinder's pressure is then recalculated in a step 250, this time using the work of expansion previously calculated for that cylinder in step 232. The calculated pressure is then stored for use later in step 252. An average cylinder pressure is calculated from the previously calculated compression and expansion pressures retrieved from storage. The average pressure value is stored is a step 256 for later use.

Figure 5E:
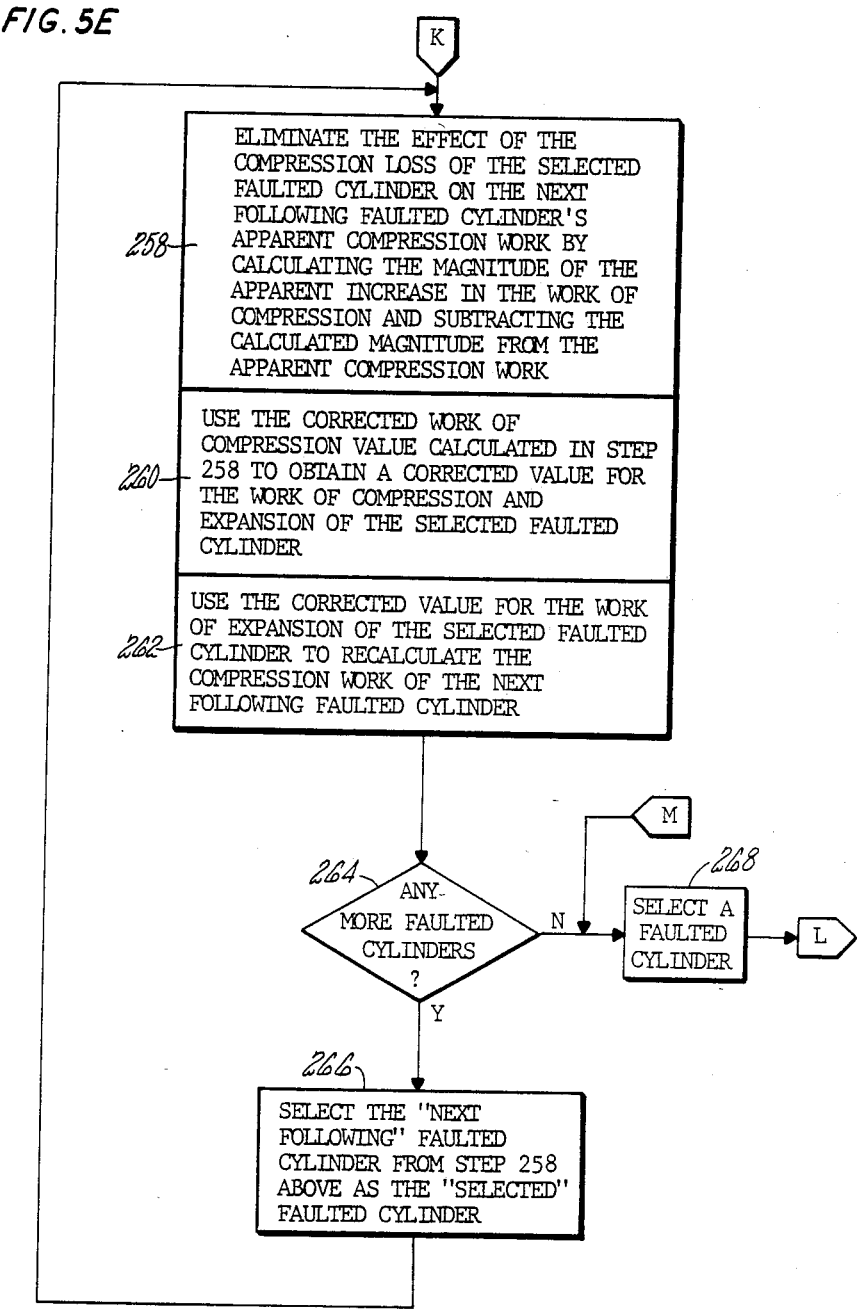

Referring now FIG. 5E, a subroutine for correcting the works of compression and expansion for engines in which more than one faulted cylinder have been detected is illustrated. Thus, for engines in which the step 242 of FIG. 5D results in a determination of more than one faulted cylinder, the subroutine of FIG. 5E is executed.

A step 258 is first executed to eliminate the effect of the compression loss of the first selected faulted cylinder on the next following faulted cylinder's apparent compression work. This is accomplished by calculating the magnitude of the apparent increase in the work of compression and subtracting the calculated magnitude from the total apparent compression work. The corrected value for the work of compression calculated in step 258 is then utilized in a step 260 to obtain a corrected value for the work of compression and expansion of the first selected faulted cylinder. The corrected value obtained in step 260 is then used in a step 262 to recalculate the compression work of the next following fualted cylinder after the first selected cylinder. A decision is then made in a step 264 as to whether anymore faulted cylinders exist. If so, the cylinder identified in step 258 "next following" the first selected faulted cylinder is now identified as the "selected" faulted cylinder in a step 266. The new "next following" faulted cylinder will then be an additional faulted cylinder or, if no additional faulted cylinders beyond two exist, the original selected faulted cylinder becomes the "next following" faulted cylinder. Steps 258–264 are then repeated until no more faulted cylinders are identified in step 264. In this way, the effects of the compression losses for all of the faulted cylinders in an engine are iteratively eliminated. Once it is determined in step 264 that no more faulted cylinders exist a faulted cylinder is selected in a step 268 for the purpose of calculating the selected faulted cylinder's pressure in steps 246–256. Once the faulted cylinder's pressure is calculated the effects of that cylinder on the apparent work of compression and expansion of the non-faulted cylinders may be calculated starting with FIG. 5F. At the conclusion of the correction process in FIG. 5G, a return is made to the subroutine illustrated in FIG. 5E to select an additional faulted cylinder in step 268. This process is continued until the effects of all of the faulted cylinders are eliminated with respect to all of the non-faulted cylinders.

In FIG. 5F, the magnitudes of the apparent increases (due to the compression loss in the faulted cylinder) in the work of expansion in each of a selected number of non-faulted cylinders preceding the faulted cylinder are calculated in a step 270. If desired, only the non-faulted cylinder immediately preceding the faulted cylinder may be calculated since the effect is greatest in a non-faulted cylinder immediately adjacent to a faulted cylinder. The calculated apparent increased magnitude for each selected non-faulted cylinder is subtracted in a step 272 from the corresponding work of expansion determined in step 232 for each such cylinder to obtain a corrected work of expansion value for each selected non-faulted cylinder. Using the corrected values of work of expansion, the pressure for each selected non-faulted cylinder is calculated in a step 274 and the pressure values obtained are stored for later use.

After having corrected for the apparent increases in the work of expansion in each of the selected number of non-faulted cylinders, a similar calculation is made for the apparent decreases in the work of compression (due to the compression loss in the faulted cylinder) in each of a selected number of non-faulted cylinders preceding the faulted cylinder in a step 276. After determining the magnitudes of the apparent decreases, the work of compression determined in step 232 for each selected non-faulted cylinder is corrected in a step 278 by adding the magnitudes of the apparent decreases in the work of compression to the corresponding work of compression determined in step 232. Using the corrected values of work of compression, the pressure for each selected non-faulted cylinder preceding the faulted cylinder is calculated in a step 280. The two pressure values calculated for each selected cylinder preceding the faulted cylinder, i.e., the pressure stored in step 274 and the pressure calculated in step 280 are averaged in step 282 and stored.

Figure 5G:
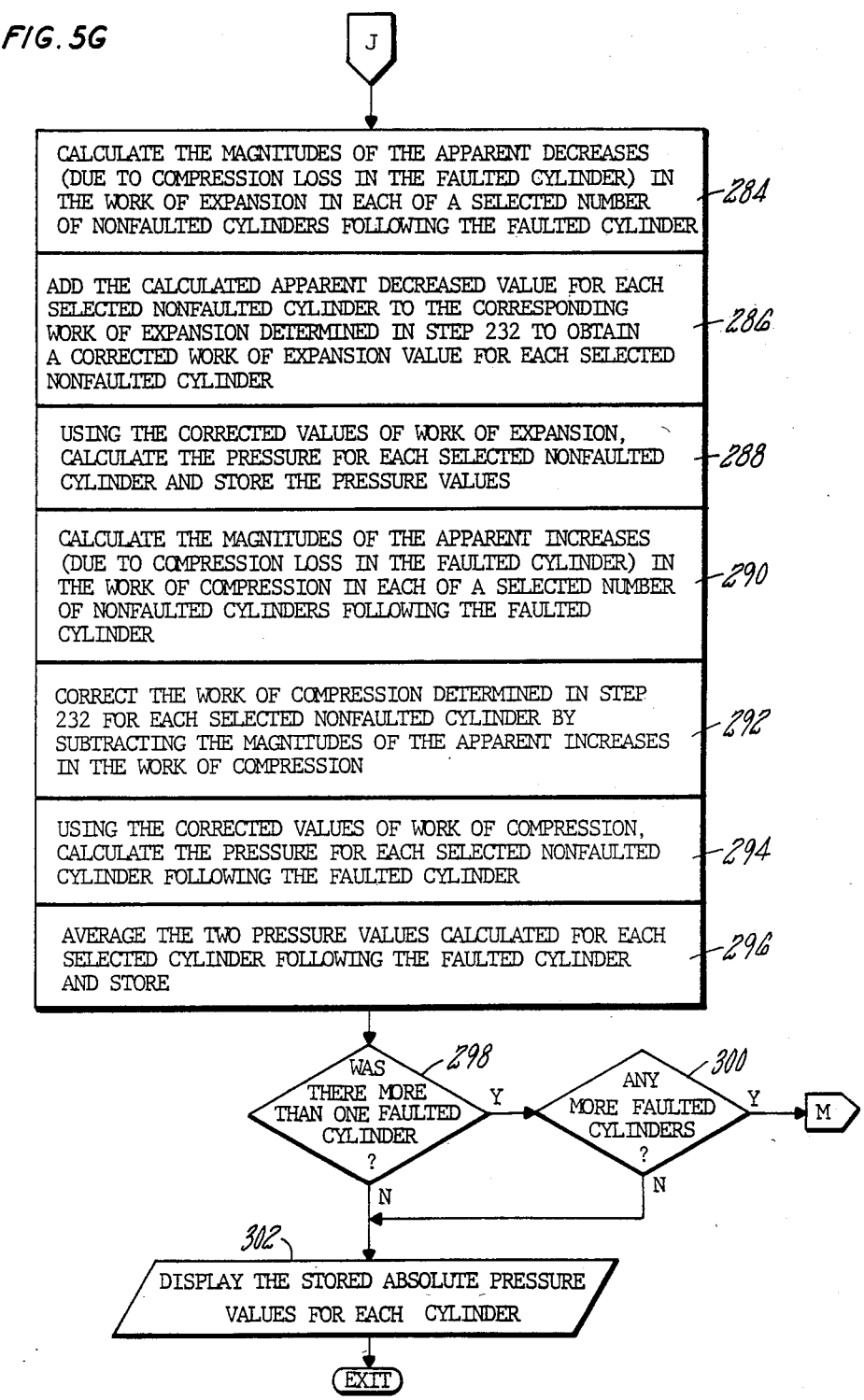

Referring now to FIG. 5G, the effects of a faulted cylinder on a non-faulted cylinder following the faulted cylinder are corrected. The magnitudes of the apparent decreases in the work of expansion in each of selected number of non-faulted cylinders following the faulted cylinder are calculated in a step 284. Of course, the calculation can be confined to only the immediately following non-faulted cylinder after the faulted cylinder. In such a case, only the gross effects are eliminated. The calculated apparent decreased values calculated in step 284 for each selected non-faulted cylinder are then added in a step 286 to the corresponding work of expansion determined in step 232 to obtain a corrected work of expansion value for each non-faulted cylinder. The corrected of work of expansion determined in step 286 are used in step 288 to calculate the pressure for each selected non-faulted cylinder. The pressure values are then stored for later use.

The magnitudes of the apparent increases (due to compression loss in the faulted cylinder) in the work of compression in each of a selected number of non-faulted cylinders following the faulted cylinder are calculated in a step 290. Of course, the selected number of non-faulted cylinders following the faulted cylinder may be selected to be one. The work of compression determined in step 232 is corrected in a step 292 for each of the selected non-faulted cylinders by subtracting the magnitudes of the apparent increases in the work of compression from each of the step 232 work of compression values. Using the corrected values of work of compression, the pressure for each selected non-faulted cylinder following the faulted cylinder is calculated in a step 294. A retrieval of the pressure values stored in step 288 is then made and the corresponding two pressure values for each selected cylinder are then averaged to obtain a better value for each cylinder and the results are stored for later display.

A decision is then made in a step 298 as to whether there was more than one faulted cylinder detected back in step 242 of step 5D. If more than one cylinder was detected faulted at that time, a decision is then made in a step 300 as to whether there are anymore faulted cylinders which need to be selected in step 268 of FIG. 5E for a calculation of the remaining faulted cylinder's pressure and for subsequent elimination of the apparent changes in work on non-faulted cylinders. If there are more faulted cylinders to be treated in this way, a return is then made to step 268 of FIG. 5E for further processing. If not, the pressure values for each cylinder are then retrieved from storage and displayed for external use.

It should be understood that the data collection method illustrated in the data acquisition unit 70 of FIG. 1 is not the only method of acquiring and conditioning raw CID and raw tooth signals. For example, referring to FIG. 21, an alternate data acquisition unit 70 is shown, along with a raw tooth data sensing probe 73a, a flywheel 18a, a clock 82a, a fuel injector rocker arm 320, a push rod 322, an injector assembly 324, a cylinder 326, and a sensing probe 328. The data acquisition unit 70 includes a counter 330 which repetitively counts clock pulses on a line 332 that may be supplied by the system clock 82a. The counter is parallel-fed to a buffer 334, the output of which comprises tooth counts on lines 336. The counter is running substantially all of the time since a very high frequency clock signal can be utilized on the line 332 (anywhere from tens of KHz to tens of MHz) whereas at speeds from 300 RPM to 2,000 RPM the frequency of raw tooth signals on line 338 may be on the order of 10 Hz to 100 Hz, depending on the number of teeth on the lines 336. Thus the few clock signals lost during the tooth to tooth resetting of the counter are miniscule.

Each time that a tooth signal appears on the line 338, the next clock signal will set a D-type flipflop 338, the Q output of which is applied to a D-type flipflop 340. The second clock signal following the tooth signal therefore sets the D-type flipflop 340, and since its Q output is applied to a D-type flipflop 342 the third clock signal will cause it to become set. The very first clock signal, after the appearance of the tooth signal, is decoded by an AND circuit 344 since it responds to Q of flipflop 338 and not Q of flipflop 340 and 342; this provides a load buffer signal on a line 346 to cause the buffer 334 to be loaded in parallel from the counter 330. The second clock signal following the apparence of the tooth signal will cause an AND circuit 348 to respond to the Q of flipflops 338 and 340 and the not Q of flipflop 342 so as to generate a clear counter signal on a line 350 which is applied to the clear input of the counter 330 causing it to be cleared to zero. The third clock signal, by setting the flipflop 342, simply eliminates the clear counter signal on the line 350 so that the next leading edge of the clock signal and all subsequent clock signals will be counted in the counter 330. Whenever the tooth signal disappears, (which is totally immaterial) the next 3 clock signals in a row will cause resetting of the flipflops 338–342, in turn, since each of their D input will go down. The counter and the buffer are independent of the resetting of the flipflops 338–342 since both AND circuits 344, 348 operate only during a progression with flipflop 338 on and flipflop 342 off, which does not occur during the resetting of the flipflops.

Thus the data acquisition unit 70 provides tooth counts on the lines 336 which are stable throughout substantially each intertooth interval. The processing apparatus 71 of FIG. 1 may therefore sample the tooth counts at the CPU's 76 parallel input ports at random. The data acquisition unit 70 of FIG. 21 thereby provides very accurate, absolute speed measurement, on a tooth to tooth basis, which provides speed indications may times within each individual cylinder stroke portion of each engine cycle.

In the diagnostic system incorporating the data acquisition unit 70 particularly described above, in FIG. 21, there may also be a proximity sensor 73a, which may comprise an RGT Model 3010-AN Magnetic Proximity Sensor, provided by Electro Corporation, Sarasota, Florida for sensing the passage of flywheel teeth 352 past a particular point adjacent to the flywheel housing, and a proximity sensor 328 such as a Model 4947 Proximity Switch distributed by electro Corporation, for sensing the presence of an engine member which moves in a unique fashion once in every cycle of the engine such as the injector rocker arm 320 illustrated. The particular engine described herein is a two stroke engine so that one revolution corresponds to each cycle. However, it should be understood that the inventive concepts disclosed herein are equally applicable to four stroke engines in which two revolutions correspond to each cycle.

Figure 21:
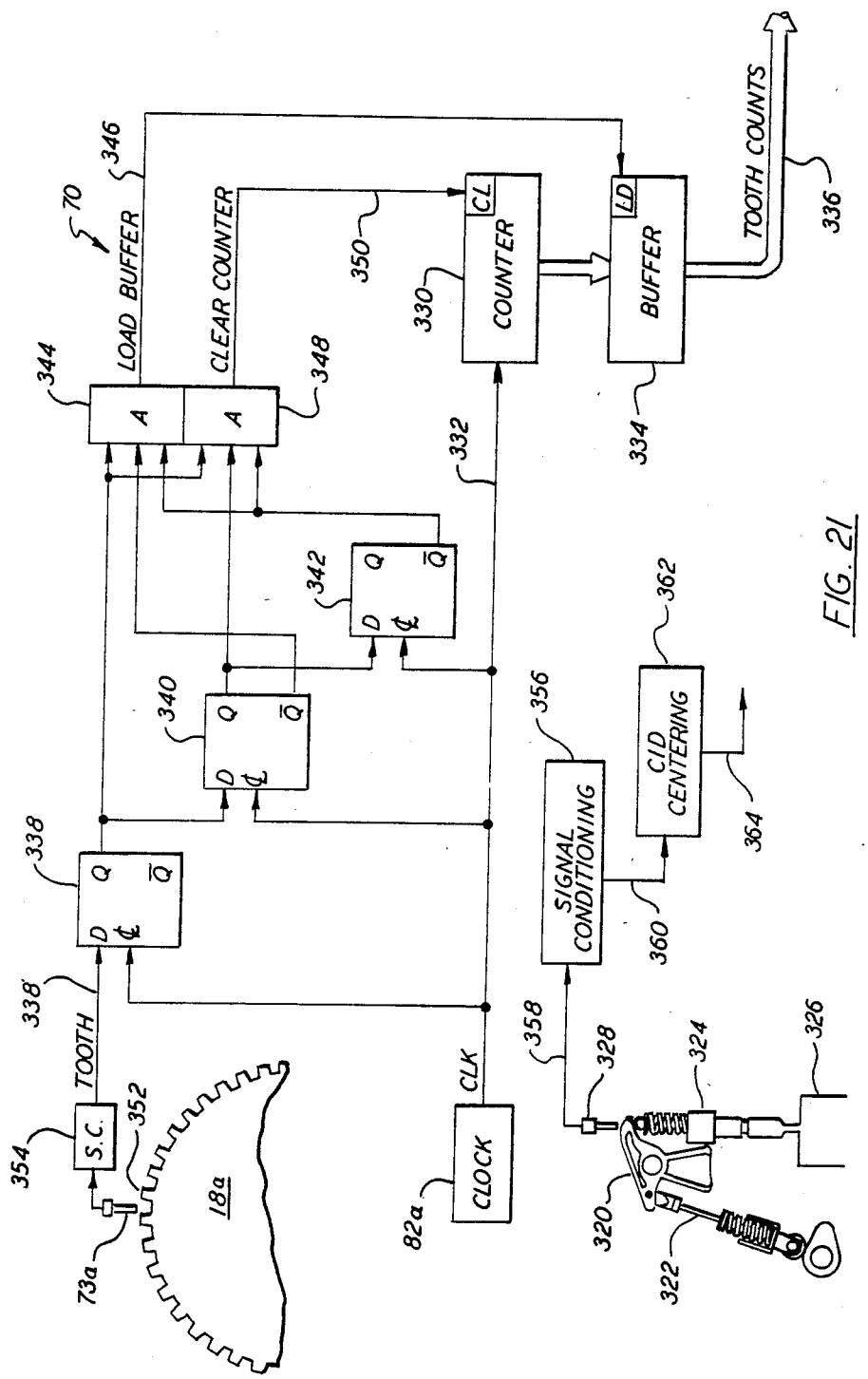
FIG. 21 is an illustration of an alternate embodiment of the data acquisition unit of FIG. 1.

Each of the sensors 73a, 328 of FIG. 21 is applied to a suitable signal conditioners 354, 356 to filter out unwanted noise, and to provide, through an amplifier, suitable level adjusting as is appropriate for the circuitry being fed thereby. A raw CID signal on a line 358 is conditioned by signal conditioning circuitry 356 which provides a conditioned CID signal on a line 360 to a CID centering circuit 362 similar to that described in hereinbefore referenced U.S. Pat. No. 4,043,189 which provides a signal indication representative of the rocker arm position which is repeatable for successive cylinder cycles over a wide range of engine vibration levels and engine RPM. The CID centering circuit 362 provides a centered CID signal on a line 364 which may be used by the CPU 76 at a discrete input thereof for indexing the tooth counts on line 336.

It should also be understood that the flowchart illustration of FIGS. 5A–5G represent merely one flowchart which may be used in implementing the inventive concepts disclosed herein. Various simplifications and modifications may be made to the basic steps of computing the work of compression and expansion for each cylinder and detecting a faulted cylinder by detemining if both the work of compression and expansion is less than that of an ideal cylinder. The method of normalizing or correcting for the effects of faulted cylinders on other cylinders disclosed herein is similarly merely only one technique of correcting for such effects. The basic concept is that, in order to obtain accurate absolute pressure measurements corrections must be made to account for the effects of faulted cylinders on other cylinders. It should also be understood that the flowchart of FIGS. 5A–5G discloses a set of steps which may be implemented in a general purpose digital computer using well known programming steps in either a higher level language or in machine language. The interstices of particular methods for achieving various minor aspects of any such implementations are not disclosed in detail since they are well known in the art. Thus, for example, the particular method of determining maxima and minima points from the speed waveform may employ comparison of sampled points to find a change in slope, or may utilize another equally valid approach such as determining the minima by taking the lowest tooth count within successive intervals and maxima by taking the highest tooth count interval within similar successive intervals.

It should also be understood that although the invention has been described for use in a decelerating engine cycle it may also be applied in a noncombustive cranking cycle or another noncombustive mode.

Similarly, although the invention has been shown and described with respect to illustrated embodiments thereof, it should be understood by those skilled in the art that the foregoing and various other changes, omissions, and additions in the form and detail thereof may be made therein without departing from the spirit and the scope of the invention.

I claim:

1. A method of measuring the absolute compression of each cylinder in an internal combustion engine having known ideal performance parameters, comprising the steps of:
    sensing the absolute angular speed of the crankshaft of an engine during at least one noncombustive engine cycle;
    relating particular subcyclic absolute speed variations to particular cylinders;
    calculating the work of expansion and the work of compression for each cylinder;
    identifying as a faulted cylinder each cylinder for which the compression work and the expansion work are each less than the work of compression and expansion, respectively, which would be performed by an ideal cylinder;
    firstly correcting, if more than one faulted cylinder is identified, for the apparent effects of the diminished work of each faulted cylinder on the calculated work of each of the other faulted cylinders;
    secondly correcting for the apparent effects of the diminished work of each faulted cylinder on the calculated work of each of the nonfaulted cylinders; and
    computing the absolute compression pressure for each cylinder during said cycle based on said corrected work calculations.

2. The method of claim 1, wherein said step of sensing the absolute angular speed of the crankshaft includes the steps of:
    sensing the passage of a number of teeth disposed on the flywheel of the engine;
    measuring the time interval between the sensing of teeth; and
    providing said absolute speed as the ratio of said number to the total number of teeth on said flywheel divided by the elapsed time measured.

3. The method of claim 1, wherein said step of relating subcyclic speed in said cycle includes the step of:
    providing a periodic indication of the passage of the stroke of the piston of a selected one of the cylinders with respect to a reference stroke position for said piston as indicated by the sensing of the cyclic displacement of an engine component member having a cyclic function directly related to the piston stroke of the selected cylinder; and
    establishing successive angular intervals within said cycle beginning with a reference angle corresponding to said indicated reference stroke position, each successive angular interval corresponding to expected subcylic speed variation intervals due to particular successive cylinders in the engine firing order.

4. The method of claim 1, wherein said step of calculating the work of expansion and compression for each cylinder includes the steps of:
    determining the angular speed peak values corresponding to each cylinder before top dead center (BTDC) and after top dead center (ATDC), and squaring said BTDC speed peak value and squaring said ATDC speed peak value;
    determining the angular speed valley value corresponding to each cylinder substantially at top dead center (TDC) and squaring said TDC speed valley value;
    calculating a measure of the work of compression for each cylinder by subtracting said square of said TDC speed valley value from said square of said BTDC speed peak value; and calculating a measure of the work of expansion for each cylinder by subtracting said square of said ATDC speed peak value from said square of said TDC speed valley value.

5. The method of claim 4, wherein said steps of calculating include the step of multiplying each of said measures of work by one half the value of the inertia of the rotating members of said engine.

6. The method of claim 1, wherein said step of firstly correcting, if more than one faulted cylinder is identified, includes the steps, for each selected faulted cylinder, of:

calculating the apparent change in work of said selected faulted cylinder due to a second selected faulted cylinder;

correcting said calculated work of said selected faulted cylinder using said calculated apparent change in work of said selected faulted cylinder to obtain a first corrected work value;

calculating the apparent change in work of said second selected faulted cylinder due to said selected faulted cylinder using said first corrected work value of said selected faulted cylinder;

correcting said calculated work of said second selected faulted cylinder using said calculated apparent change in work of said second selected cylinder to obtain a second corrected work value; and recalculating the change in work of said selected faulted cylinder due to said second selected faulted cylinder using said second corrected work value of said second selected faulted cylinder.

7. The method of claim 1, wherein said step of secondly correcting includes, for each selected nonfaulted cylinder, the steps of:

calculating the apparent change in work of said selected nonfaulted cylinder due to each faulted cylinder; and correcting said calculated work of said selected nonfaulted cylinder using said calculated apparent changes in work of said selected nonfaulted cylinder due to each faulted cylinder to obtain a corrected work value for said selected nonfaulted cylinder.

8. The method of claim 1, wherein said step of computing the absolute compression pressure includes the step of substituting a calculated work value into a predetermined equation expressing absolute compression pressure as a function of work to obtain said absolute compression pressure for each cylinder.

9. The method of claim 1, further comprising the step of displaying the absolute compression pressure for each cylinder.

10. Apparatus for measuring the absolute compression of each cylinder in an internal combustion engine having known ideal performance parameters, comprising:

first sensing means adapted to be disposed for a response to the magnitude of an engine parameter, the magnitude of which fluctuates in conjunction with the cylinder-related absolute angular velocity including subcylic excursions in engine angular velocity as a consequence of the compression and expansion strokes of the individual pistons, said sensing means providing a corresponding engine angular velocity signal;

second sensing means adapted to be disposed for a response to the stroke of a particular engine cylinder piston through a reference piston position as manifested by the cyclic displacement of an engine component member having a cyclic function directly related to the piston stroke of said particular cylinder piston for providing a series of sensed, periodic cylinder identification (CID) signal pulses representative of said stroke through said reference piston position to mark engine cycles;

data acquisition means, responsive to said engine angular velocity signal and to said CID signal pulses, for registering said angular velocity signal with respect to said CID signal pulses to provide a registered angular velocity signal for each engine cycle; and signal processing means, responsive to said registered angular velocity signal from said data acquisition means over at least one engine cycle, for providing signal manifestations indicative of the work of compression and the work of expansion for each cylinder, said signal processing means comparing the magnitudes of said work signal manifestations to stored signals having magnitudes indicative of the work of an ideal cylinder and for providing cylinder fault signals identifying those cylinders as faulted cylinders for which said comparison indicates that the work of compression and expansion are each less than ideal, said signal processing means counting said fault signals to determine the number of faulted cylinders detected and, if more than one faulted cylinder is detected, providing for each faulted cylinder work signal manifestations corrected for the apparent effects of the diminished work of each faulted cylinder, said signal processing means providing for each nonfaulted cylinder work signal manifestations corrected for the apparent effects of the diminished work of each faulted cylinder, said signal processing means providing pressure signals having magnitudes indicative of the absolute compression pressure for each cylinder.

11. The apparatus of claim 10, wherein said first sensing means senses the passage of a number of teeth disposed on the flywheel of the engine and provides said angular velocity signal having a magnitude indicative of said number of teeth to said signal processing means for providing an elapsed time signal indicative of the number of timed intervals elapsed during said passage and for dividing the magnitude of said angular velocity signal by a signal having a magnitude indicative of the total number of teeth on said flywheel to provide a ratio signal and for dividing the magnitude of said ratio signal by the magnitude of said elapsed time signal to provide a signal having a magnitude indicative of the absolute velocity of said flywheel.

12. The apparatus of claim 10, further comprising display means responsive to said pressure signals for displaying the absolute compression pressure of each cylinder.

13. The apparatus of claim 10, wherein said signal processing means periodically samples and stores the magnitude of said registered angular velocity signal and compares the presently sampled value to the previously stored values to detect changes in slope within preselected angular intervals registered with respect to said CID signal and thereby determines angular velocity maxima and minima separately attributed to the expression and compression strokes, respectively, of individual cylinders in a least one engine cycle and provides speed maxima and minima signals having magnitudes indicative thereof, said signal processing means providing signals having magnitudes indicative of the squares of said speed maxima and minima signals, said signal processing means providing a measure of the compression work performed by each cylinder by subtracting, for each cylinder, a signal having a magnitude indicative of the square of said attributed angular velocity minima substantially at top dead center for each cylinder from a corresponding signal having a magnitude indicative of the square of the attributed angular velocity maxima before top dead center and providing a compression work difference signal as said measure of the compression work, said signal processing means providing a measure of the expansion work performed by each cylinder by subtracting, for each cylinder, a signal having a magnitude indicative of the square of the attributed angular velocity maxima after top dead center from a corresponding signal having a magnitude indicative of the square of the attributed angular velocity minima at top dead center and providing an expansion work difference signal as said measure of the expansion work, said signal processing means comparing said compression and expansion work difference signal magnitudes to stored signals having magnitudes indicative, respectively, of the compression and expansion work of an ideal cylinder and, for each cylinder determined to have both compression and expansion work difference signal magnitudes less than an ideal cylinder, providing said cylinder fault signal which uniquely identifies each such less than ideal cylinder as faulted.

14. The apparatus of claim 13, wherein said signal processing means multiplies the magnitude of each of said difference signals by a signal having a magnitude indicative of one half the inertia of the rotating members of said engine.

15. The apparatus of claim 10, wherein said signal processing means calculates, if more than one faulted cylinder is detected, the apparent change in work of a selected faulted cylinder due to each of the other faulted cylinders by changing the magnitude of said selected faulted cylinder's work manifestation according to predetermined relations expressing each apparent change due to each of the other faulted cylinders as a function of the work of each faulted cylinder and adding each apparent changed magnitude to the magnitude of said work signal manifestation to obtain a corrected work signal manifestation for said selected faulted cylinder and repeating the correction process for each of the other faulted cylinders in an iterative manner using corrected faulted cylinder work signal manifestations until all of said faulted cylinder work signal manifestations have been corrected.

16. The apparatus of claim 10, wherein said signal processing means calculates, if more than one faulted cylinder is identified, the apparent change in the work of compression of a selected faulted cylinder following a second selected faulted cylinder by changing the magnitude of said expansion work signal manifestation corresponding to said second selected faulted cylinder according to a first predetermined relation expressing the change in compression work of a nonfaulted cylinder as a function of the expansion work of a faulted cylinder and adding said changed magnitude to the magnitude of said compression work signal manifestation corresponding to said selected faulted cylinder to obtain a first corrected compression work signal magnitude for said selected faulted cylinder, said signal processing means calculating the apparent change in the compression work of said second selected faulted cylinder preceding said selected faulted cylinder by changing the magnitude of the compression work signal manifestation corresponding to said selected faulted cylinder according to a predetermined relation expressing the change in compression work of a preceding nonfaulted cylinder as a function of the compression work of a following faulted cylinder and adding said changed magnitude to the magnitude of said compression work signal manifestation corresponding to said second selected faulted cylinder to obtain a corrected compression work signal magnitude for said second selected faulted cylinder, said signal processing means calculating the apparent change in the work of expansion of said second selected faulted cylinder preceding said selected faulted cylinder by changing the magnitude of said compression work signal manifestation corresponding to said selected faulted cylinder according to a predetermined relation expressing the change in expansion work of a preceding nonfaulted cylinder as a function of a following faulted cylinder's work of compression and adding said changed magnitude to the magnitude of said expansion work signal manifestation corresponding to said second selected faulted cylinder to obtain a corrected expansion work signal magnitude for said second selected faulted cylinder, said signal processing means recalculating the apparent change in the work of compression of said selected faulted cylinder following said second selected faulted cylinder by changing the magnitude of said corrected expansion work signal mangitude for said second selected faulted cylinder according to said first predetermined relation and adding said changed magnitude to said magnitude of said compression work signal manifestation corresponding to said selected faulted cylinder to obtain a second corrected compression work signal magnitude for said selected faulted cylinder, said signal processing means calculating the absolute compression pressure of both said selected and said second selected faulted cylinders by modifying said corrected compression work signal magnitude for said second selected faulted cylinder and said second corrected compression work signal magnitude for said selected faulted cylinder according to at least one relation expressing absolute cylinder pressure as a function of the work of compression of a faulted cylinder.

17. The apparatus of claim 10, wherein said signal processing means calculates the apparent change in work of a selected nonfaulted cylinder due to each faulted cylinder by changing the magnitude of said nonfaulted cylinder's work signal manifestation according to predetermined relations expressing each apparent change as a function of the work of each faulted cylinder and adding each apparent changed magnitude to the magnitude of said work signal manifestation to obtain a corrected work signal manifestation for said selected nonfaulted cylinder.

* * * * *